United States Patent
Kim et al.

(10) Patent No.: US 12,474,184 B2
(45) Date of Patent: Nov. 18, 2025

(54) INTEGRATED SYSTEM FOR DRIVING AND LOCATION RECOGNITION OF MOBILE MAGNETIC SUBSTANCES

(71) Applicant: KOREA INSTITUTE OF MEDICAL MICROROBOTICS, Gwangju (KR)

(72) Inventors: Chang Sei Kim, Gwangju (KR); Chan Kim, Gwangju (KR); Jong Oh Park, Gyeonggi-do (KR); Ja Young Kim, Daejeon (KR)

(73) Assignee: KOREA INSTITUTE OF MEDICAL MICROROBOTICS, Gwangju (KR)

( * ) Notice: Subject to any disclaimer, the term of this patent is extended or adjusted under 35 U.S.C. 154(b) by 109 days.

(21) Appl. No.: 18/285,526

(22) PCT Filed: Oct. 26, 2021

(86) PCT No.: PCT/KR2021/015093
§ 371 (c)(1),
(2) Date: Oct. 4, 2023

(87) PCT Pub. No.: WO2022/265167
PCT Pub. Date: Dec. 22, 2022

(65) Prior Publication Data
US 2024/0183688 A1 Jun. 6, 2024

(30) Foreign Application Priority Data
Jun. 14, 2021 (KR) .......... 10-2021-0076954

(51) Int. Cl.
*G01D 5/20* (2006.01)
(52) U.S. Cl.
CPC ...................... *G01D 5/20* (2013.01)
(58) Field of Classification Search
None
See application file for complete search history.

(56) References Cited

U.S. PATENT DOCUMENTS

| | | | |
|---|---|---|---|
| 8,689,800 B2 * | 4/2014 | Lin | A61B 34/70 |
| | | | 128/899 |
| 9,031,633 B2 * | 5/2015 | Rahmer | A61B 5/05 |
| | | | 600/409 |

(Continued)

FOREIGN PATENT DOCUMENTS

| | | |
|---|---|---|
| KR | 10-1623116 B1 | 5/2016 |
| KR | 10-2020-0101161 A | 8/2020 |

(Continued)

OTHER PUBLICATIONS

Kim, C., et al.; "Localization and Actuation for MNPs Based on Magnetic Field-Free Point: Feasibility of Movable Electromagnetic Actuations", Micromachines 2020, 11, 1020, pp. 1-15.

(Continued)

*Primary Examiner* — Richard Isla
(74) *Attorney, Agent, or Firm* — Harness, Dickey & Pierce, P.L.C.

(57) ABSTRACT

The present disclosure relates to an integrated system for driving a magnetic body and recognizing the position thereof. The system includes a magnetic field generating unit having four electromagnetic coils radially spaced apart from each other by the same distance and a coil frame to which the electromagnetic coils are connected, an RF coil unit disposed in a through-hole included in the center of the coil frame, a driving unit orthogonal to the coil frame and connected to allow the coil frame to slide in one axial direction, and a processing unit configured to generate movement path information of the coil frame and desired current information of each of the electromagnetic coils.

12 Claims, 19 Drawing Sheets

(56) References Cited

U.S. PATENT DOCUMENTS

| | | | | |
|---|---|---|---|---|
| 9,689,932 | B2* | 6/2017 | Bontus | G01R 33/02 |
| 9,872,631 | B2* | 1/2018 | Timinger | A61B 5/05 |
| 10,222,438 | B2* | 3/2019 | Weaver | G01R 33/4808 |
| 12,014,869 | B2* | 6/2024 | Jang | A61B 34/35 |
| 2006/0269612 | A1* | 11/2006 | Xiang | A61K 41/0052 |
| | | | | 424/646 |
| 2020/0289839 | A1 | 9/2020 | Hensley et al. | |

FOREIGN PATENT DOCUMENTS

| | | |
|---|---|---|
| KR | 10-2020-0114841 A | 10/2020 |
| WO | WO-2018/138631 A1 | 8/2018 |

OTHER PUBLICATIONS

International Search Report from corresponding PCT Application No. PCT/KR2021/015093, dated Apr. 18, 2022.

\* cited by examiner generating formula $$D = \begin{bmatrix} B(P) \\ G_x(P) \\ G_y(P) \\ G_z(P) \end{bmatrix} \begin{bmatrix} i_1 \\ i_2 \\ i_3 \\ i_4 \end{bmatrix} = QM_u(P)I$$

$$I = Q^{-1}M_u^+ D = [i_1\ i_2\ i_3\ i_4]^T$$

$$D = [B_x\ B_y\ B_z\ G_{xx}\ G_{xy}\ G_{xz}\ G_{yx}\ G_{yy}\ G_{yz}\ G_{zx}\ G_{zy}\ G_{zz}]^T$$

$$M_u(:,i) = [B_{xi}\ B_{yi}\ B_{zi}\ G_{xxi}\ G_{xyi}\ G_{xzi}\ G_{yxi}\ G_{yyi}\ G_{yzi}\ G_{zxi}\ G_{zyi}\ G_{zzi}]^T (i=1,2,3,4)$$

B: desired current[T]
Gx: B(P)-partial derivatives for the x, y, and z axis directions[T/m]
I: current applied to each coil[A]
Mu(P): matrix of the field free point data required for each coil
Q: weighted matrix to improve accuracy of the field free point(Weighted norm matrix)
D: desired magnetic field and gradient values for each axis relative to the field free point

- matrix of magnetic field and gradient values at the i-th coil as a function of FFP position ($M_u \in 12 \times 4$)
- The main variable for the FFP is the magnetic field gradient.

FIG. 4a

Extract $(M_u \in 12 \times 4)$ matrix data based on FFP occurrence location (1) - $M_u(:,1) = [B_{x1}\ B_{y1}\ B_{z1}\ G_{xx1}\ G_{xy1}\ G_{xz1}\ G_{yx1}\ G_{yy1}\ G_{yz1}\ G_{zx1}\ G_{zy1}\ G_{zz1}]^T$
(2) - $M_u(:,2) = [B_{x2}\ B_{y2}\ B_{z2}\ G_{xx2}\ G_{xy2}\ G_{xz2}\ G_{yx2}\ G_{yy2}\ G_{yz2}\ G_{zx2}\ G_{zy2}\ G_{zz2}]^T$
(3) - $M_u(:,3) = [B_{x3}\ B_{y3}\ B_{z3}\ G_{xx3}\ G_{xy3}\ G_{xz3}\ G_{yx3}\ G_{yy3}\ G_{yz3}\ G_{zx3}\ G_{zy3}\ G_{zz3}]^T$
(4) - $M_u(:,4) = [B_{x4}\ B_{y4}\ B_{z4}\ G_{xx4}\ G_{xy4}\ G_{xz4}\ G_{yx4}\ G_{yy4}\ G_{yz4}\ G_{zx4}\ G_{zy4}\ G_{zz4}]^T$ Set magnetic field B and gradient value G at the FFP location $D = [B_x\ B_y\ B_z\ G_{xx}\ G_{xy}\ G_{xz}\ G_{yx}\ G_{yy}\ G_{yz}\ G_{zx}\ G_{zy}\ G_{zz}]^T$ Substitute weight matrix Q $Q = \begin{bmatrix} W & 0 \\ 0 & I_{dig} \end{bmatrix}, W = \begin{bmatrix} W_1 & 0 & 0 \\ 0 & W_2 & 0 \\ 0 & 0 & W_3 \end{bmatrix}, I_{dig} \in 9 \times 9\ (Unit\ matrix)$ Apply current value to each coil $I = Q^{-1} M_u^+ D = [i_1\ i_2\ i_3\ i_4]^T$

FIG. 4b

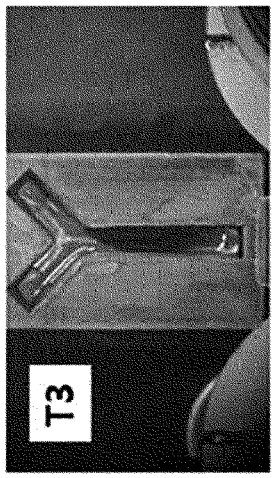
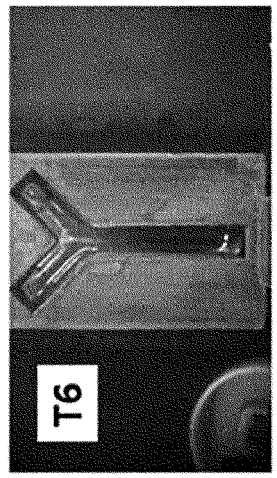
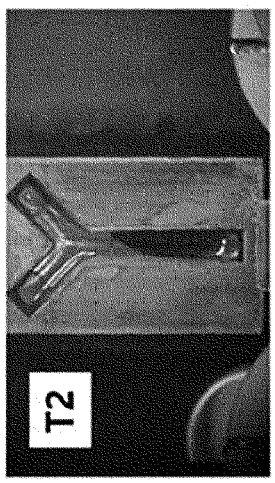
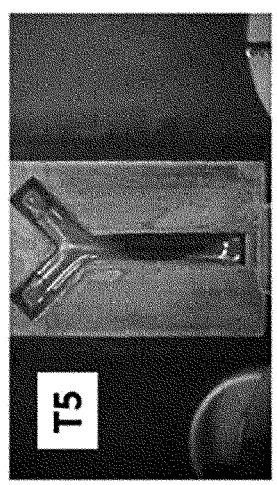
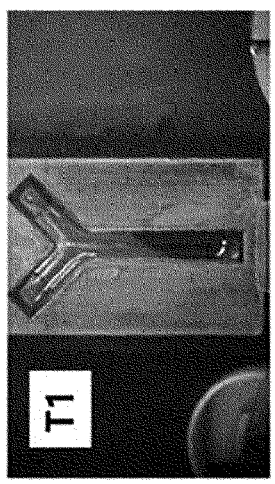
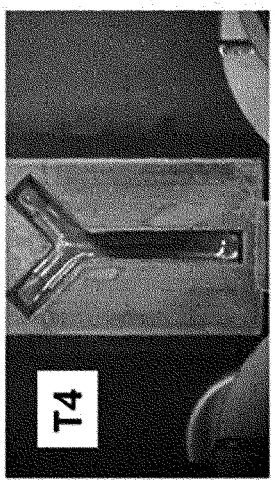
FIG. 11b

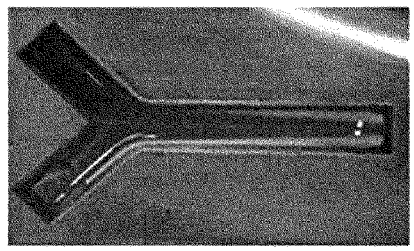
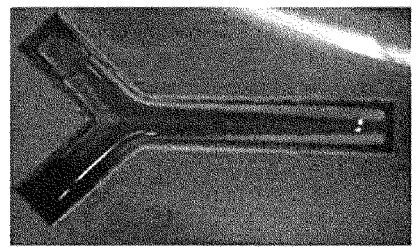
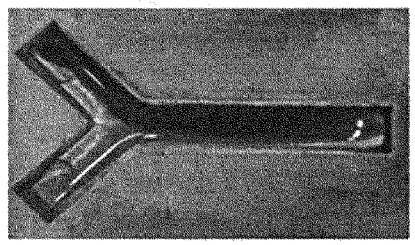
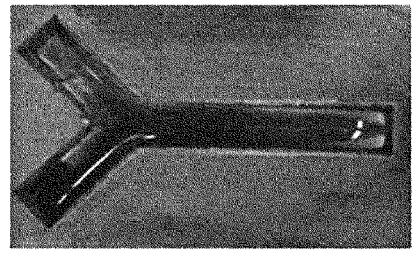
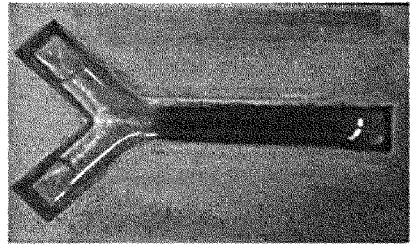
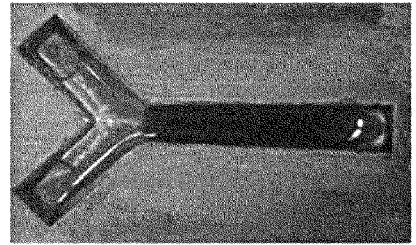
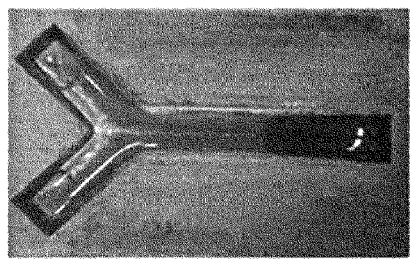
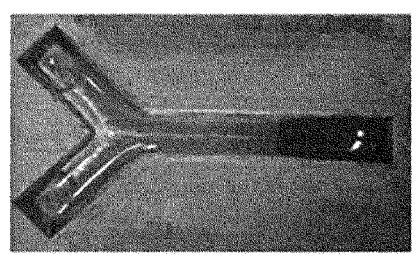
FIG. 11e

INTEGRATED SYSTEM FOR DRIVING AND LOCATION RECOGNITION OF MOBILE MAGNETIC SUBSTANCES

CROSS-REFERENCE TO RELATED APPLICATIONS

This application is a national phase application of PCT Application No. PCT/KR2021/015093 filed on 26 Oct. 2021, which claims priority to Korean Patent Application No. 10-2021-0076954, filed on 14 Jun. 2021. The entire disclosures of the applications identified in this paragraph are incorporated herein by references.

TECHNICAL FIELD

The present disclosure was made with the support of the Ministry of Science and ICT, the Ministry of Trade, Industry and Energy, the Ministry of Health and Welfare, and the Ministry of Food and Drug Safety of the Republic of Korea under Project ID No. 1415184155 and Sub-Project No. RS-2021-KD000001. This research was conducted by the Korea Institute of Medical Microrobotics as part of the program titled "Development of a Medical Device for Active and Precise Delivery of Therapeutic Substances Based on Microcarriers for Knee Cartilage Regeneration." It falls under the broader research project "Korea Medical Device Development Project," managed by the Korea Medical Device Development Fund (KMDF). The project was carried out with a contribution rate of 50% from Jan. 1, 2024, to Dec. 31, 2024.

The present disclosure was made with the support of the Ministry of Trade, Industry & Energy (MOTIE) of the Republic of Korea under Project ID No. 1415180101 and Sub-Project No. 20017903. This research was conducted by the Korea Institute of Medical Microrobotics as part of the program titled "A Convergent Medical Device for Active and Precise Delivery of Embolic Particles in Transarterial Chemoembolization for Liver Tumor Treatment and a Simulator for Embolization Training." It falls under the broader research project "Biotechnology Industry Technology Development Project," managed by the Korea Planning & Evaluation Institute of Industrial Technology (KEIT). The project was carried out with a contribution rate of 50% from Jan. 1, 2024, to Dec. 31, 2024.

The present disclosure relates to an integrated system for driving a magnetic body and recognizing the position thereof, the system including: a magnetic field generating unit including four electromagnetic coils radially spaced apart from each other by the same distance, and a coil frame to which the electromagnetic coils are connected; an RF coil unit disposed in a through-hole included in the center of the coil frame; a driving unit orthogonal to the coil frame and connected to allow the coil frame to slide in one axial direction; and a processing unit configured to generate movement path information of the coil frame and desired current information of the electromagnetic coil.

BACKGROUND ART

The future of external drive-based targeted drug delivery (TDD) using magnetic nanoparticles (MNPs) and magnetic fields is promising compared with existing drug delivery technologies commonly used in cancer treatment. Targeted drug delivery is considered a competitive solution to the treatment requirements of cancerous tumors. This is because targeted drug delivery has shown advantages in reducing toxicity and optimizing doses, which have been major problems with existing cancer treatment regimens, including radiation therapy, chemotherapy, and hormone therapy.

Several candidate materials related to the material of magnetic nanoparticles have been studied for the realization of targeted drug delivery. Magnetic nanoparticles have emerged as a promising carrier composition because they have magnetic properties that enable them to be moved using a magnetic field induced by an external device. In addition, because of their nanoscale size and ability to be fabricated in various shapes, magnetic nanoparticles are theoretically expected to be suitable as a main material for targeted drug delivery.

However, in practice, particles aggregate in the vascular environment make nanoparticle imaging difficult and reduce the driving efficiency of nanoparticles due to the small scale thereof, thus lowering ease of operation.

A simplified system capable of localizing magnetic nanoparticles to a region of interest (ROI) by externally driving magnetic nanoparticles is required to implement a targeted drug delivery system in clinical practice, in consideration of the actual size of the human body.

Regarding the above system, electromagnetic actuators (EMA) are widely used in micro-sized robotic actuation systems such as capsule endoscopes (CEs) as well as used to deliver magnetic drug carriers to targeted lesions. Other approaches, such as acoustic radiation force (ARF), bilayer-structured microrobots reacting thermo-electromagnetically, and octagram-shaped micro grippers, have also been studied.

Most drug delivery mechanisms based on magnetic nanoparticles use an external magnetic field interacting with the magnetic nanoparticles to move the nanoparticles to a region of interest (ROI). The challenge with this system is to generate the appropriate magnetic field and magnetic gradient fields to manipulate the magnetic nanoparticles.

In this regard, a magnetic nanoparticle (MNP) tracking system known as magnetic particle imaging (MPI) has been developed. Magnetic particle imaging (MPI) has higher detection sensitivity for superparamagnetic iron oxides (SPIOs), enabling higher spatial and temporal resolutions to be realized. The SPIOs are contrast agents used in MRI examinations, and their safety has been clinically proven.

Magnetic particle imaging (MPI) can derive sharp images by obtaining nonlinear responses of SPIOs induced by exposure to field free points (FFPs) and field free lines (FFLs). However, the typical magnetic field generating device in the related art requires an additional driving device for controlling the FFP, which causes the generating device to be provided with at least three pairs of driving coils, resulting in increased size of the system.

Therefore, there is an urgent need to develop a simplified system capable of recognizing the three-dimensional position of magnetic nanoparticles (MNPs) while solving size problems.

DETAILED DESCRIPTION OF THE INVENTION

Technical Problem

In order to solve the requirements described above, new field free point (FFP) and field free line (FFL) control mechanism is suggested to propose an integrated system for driving a magnetic body and recognizing the position thereof, which shows small errors in spite of using a system simplified for integration of driving and position recognition with respect to a magnetic body.

In addition, the present inventors have invented a system including: a magnetic field generating unit including electromagnetic coils radially spaced apart from each other; an RF coil unit disposed in a through-hole included in the center of a coil frame; a driving unit orthogonal to the coil frame and connected to allow the coil frame to slide in one axial direction; and a processing unit configured to generate movement path information of the coil frame and desired current information of the electromagnetic coils.

As noted from the result of recognizing the position of a magnetic body by using the system, the system can be simplified using fewer coils than a system equipped with the existing MPI scanner, can recognize the position of the magnetic body with a low error, and can also drive the magnetic body.

Accordingly, an aspect of the present disclosure is to provide an integrated system for driving a magnetic body and recognizing the position thereof.

Another aspect of the present disclosure is to provide a method of driving a magnetic body and recognizing the position thereof.

Technical Solution

The present disclosure relates to an integrated system for driving a magnetic body and recognizing the position thereof, and a method of recognizing the position of a magnetic body by using the same. According to the present disclosure, the position and shape of magnetic nanoparticles can be recognized by imaging the magnetic nanoparticles even with fewer coils, compared with the existing MPI scanner-based magnetic nanoparticle driving method. Accordingly, a space for installing the system can be simplified and accessibility to a patient can be improved.

Hereinafter, the present disclosure will be provided in more detail.

An example of the present disclosure relates to an integrated system for driving a magnetic body and recognizing the position thereof, the system including: a magnetic field generating unit including four electromagnetic coils radially spaced apart from each other by the same distance, and a coil frame to which the electromagnetic coils are connected; an RF coil unit disposed in a through-hole included in the center of the coil frame; a driving unit orthogonal to the coil frame and connected to allow the coil frame to slide in one axial direction; and a processing unit configured to generate movement path information of the coil frame and desired current information of the electromagnetic coils,
wherein the four electromagnetic coils each has the central axis being directed toward the center of the coil frame and forms an angle of 45 degrees with respect to an axis perpendicular to the longitudinal axis of the driving unit, and the driving unit moves the coil frame according to the movement path information.

In the present disclosure, the magnetic field generating unit may include four electromagnetic coils radially spaced apart from each other by the same distance, and a coil frame to which the electromagnetic coils are connected.

In the present disclosure, the electromagnetic coil may include at least one selected from the group consisting of a solenoid coil, a circular coil, a square coil, and a saddle coil, and may be, for example, a solenoid coil, but is not limited thereto.

In the present specification, the term "solenoid coil" may be interpreted as a device made by tightly coiling a wire into a cylindrical shape, and the solenoid can generate a magnetic field when electricity flows therethrough, and thus can be used as an electromagnet.

In the present specification, the term "circular coil" can be interpreted as a circular electromagnet, and the circular electromagnet refers to a ring-shaped magnet, that is, an endless magnet with no demagnetizing force affecting the ends thereof.

In the present disclosure, each of the four electromagnetic coils may receive current independently from a power source.

In the present disclosure, the four electromagnetic coils may be radially spaced apart from each other by the same distance.

In one embodiment of the present disclosure, the inner diameter of the electromagnetic coil may be, for example, 1.50 mm, but is not limited thereto.

In one embodiment of the present disclosure, the outer diameter of the electromagnetic coil may be, for example, 62.0 mm, but is not limited thereto.

In one embodiment of the present disclosure, the length of the electromagnetic coil may be, for example, 206 mm, but is not limited thereto.

In the present disclosure, the number of windings of the electromagnetic coil may be, for example, 640 to 680, but is not limited thereto.

The electromagnetic coil may be obtained by winding copper wire, for example, but is not limited thereto.

In the present disclosure, the coil frame may refer to a support connected to the electromagnetic coil.

The coil frame may include a through-hole formed through the center thereof. Accordingly, the magnetic body may pass through the through-hole included in the center of the coil frame.

In the present disclosure, the RF coil unit may be disposed in the through-hole included in the center of the coil frame.

In one embodiment of the present disclosure, the RF coil unit may be connected to one side of the through-hole included in the center of the coil frame, to be disposed in the through-hole.

In the present disclosure, the RF coil unit may include a region of interest (ROI).

In the present disclosure, the RF coil unit may include an Rx coil and a Tx coil.

The Rx coil (receive coil) is a coil exclusively used for receiving a radio signal, and the Tx coil (transmit coil) may refer to a coil exclusively used for transmitting a radio signal.

In one embodiment of the present disclosure, the outer circumferential surface of the receive coil (Rx-coil) is the same as the inner circumferential surface of the transmit coil (Tx-coil), and the outer circumferential surface of the receive coil may be connected to the inner circumferential surface of the transmit coil.

Through this, the size of the region of interest included in the RF coil unit may be widened, and the intensity of the RF reflection signal may be strengthened.

In the present disclosure, the central axis of each of the four electromagnetic coils may be directed toward the center of the RF coil unit.

In the present disclosure, the driving unit may be orthogonal to the coil frame and connected to allow the coil frame to slide in one axial direction.

In one embodiment of the present disclosure, the one axial direction may refer to the "Z-axis" direction.

In the present disclosure, "Z-axis" refers to an axis parallel to the longitudinal axis of the driving unit and perpendicular to the plane including the coil frame.

In the present disclosure, "Y-axis" refers to an axis vertical with respect to the longitudinal axis of the driving unit.

In the present disclosure, "X-axis" refers to an axis simultaneously perpendicular to "Y-axis" and "Z-axis" in a three-dimensional space.

In the present disclosure, the processing unit may generate movement path information of the coil frame and desired current information of the electromagnetic coil.

In the present disclosure, the movement path information of the coil frame may be information by which the driving unit controls the coil frame to identify the position of the magnetic body on the Z-axis.

In the present disclosure, desired current information of the electromagnetic coil may be applied to the electromagnetic coil to scan a region of interest (ROI) in which a magnetic body is expected to be present, so as to perform control such that the electromagnetic coil generates and moves a field free point (FFP) or a field free line (FFL).

In the present specification, the term "field free point" (FFP) refers to a point at which the strength of the magnetic field is 0, among the magnetic fields generated by the electromagnetic coil.

In the present specification, the term "field free line" (FFL) refers to a line in which the strength of the magnetic field is 0, among the magnetic fields generated by the electromagnetic coil.

The field free line enables linear scanning of the magnetic body, and thus the scanning time compared with using the field free point.

Another example of the present disclosure relates to a method of recognizing the position of a magnetic body, the method including: a path-setting operation of generating a field free point or a field free line through a magnetic field generating unit and setting a first scan path that is a movement path of the field free point or the field free line; a first scan operation of scanning a magnetic body along the first scan path and receiving a first reflection signal reflected from the magnetic body; a first position recognition operation of identifying a first position of the magnetic body, which is a position on the Z-axis perpendicular to the magnetic field generating unit, by using the first reflection signal; a second scan operation of scanning the magnetic body along a second scan path on the XY plane perpendicular to the Z-axis, at the first position of the magnetic body and receiving a second reflection signal reflected from the magnetic body; and a second position recognition operation of identifying a second position of the magnetic body on the XY plane by using the second reflection signal.

In the present disclosure, the path-setting operation may include generating a field free point (FFP) or a field free line (FFL) through the magnetic field generating unit, and setting the first scan path that is a movement path of the field free point or the field free line.

In the present disclosure, the first scan path may refer to a path for recognizing the position of a magnetic body by moving the field free point (FFP) or field free line (FFL) in one axial direction.

In one embodiment of the present disclosure, the first scan path may be a path for recognizing the position of the magnetic body on the Z-axis, which is the first position of the magnetic body, by using the field free point or the field free line in the Z-axis direction.

In the present disclosure, the first scan path may be a straight path parallel to the Z-axis or a zigzag path formed around the Z-axis, and may be, for example, a straight path parallel to the Z-axis, but is not limited thereto.

In the present disclosure, the first scan path may be calculated from movement path information of the coil frame and desired current information of the electromagnetic coil.

In the present disclosure, the movement path information of the coil frame may be related to an axial path in which the driving unit slides and drives the coil frame.

In the present disclosure, the desired current information of the electromagnetic coil may be calculated by Equation 12.

In the present disclosure, the first scan operation may include scanning the magnetic body along the first scan path and receiving the first reflection signal reflected from the magnetic body.

In one embodiment of the present disclosure, the first scan operation may be performed by the driving unit sliding and driving the coil frame in one axial direction and the electromagnetic coil applying a magnetic field to the magnetic body.

In the present disclosure, the magnetic body may be a magnetic nanoparticle or a microrobot including the same, but is not limited thereto.

In the present specification, the term "microrobot" as a type of implantable medical device may be classified into a mechanical/electronic microrobot that include permanent magnets or soft magnetic body in millimeter, micrometer, and nanometer scales, such as a vascular robot and an active capsule endoscope, and a polymer/cell-based microrobot containing magnetic nanoparticles as micro/nanoscale magnetic bodies, such as a microcarriers for DDS, a microscaffold for cell therapy delivery, a nanorobot, and a macrophage robot, and other types of microrobots may be included therein.

The microrobot according to the present disclosure may further include one or more selected from the group consisting of a camera module, a position information providing unit, a driving unit, a treatment unit, a robot control unit, a data transmitting/receiving unit, and a wireless power receiving unit.

In the present disclosure, the first position recognition operation may include identifying the first position, which is the position of the magnetic body on the Z-axis perpendicular to the magnetic field generating unit, by using the first reflection signal.

When the electromagnetic coil applies a magnetic field of a certain intensity to the magnetic body, the intensity of the first reflection signal reflected therefrom varies based on the distance between the electromagnetic coil and the magnetic body. Therefore, the first position of the magnetic material may be a position where the intensity of the first reflection signal is maximum on the first scan path.

In the present disclosure, the magnetic field generating unit may include four electromagnetic coils radially spaced apart from each other by the same distance, and a coil frame to which the electromagnetic coils are connected.

In one embodiment of the present disclosure, the first position may include position information of the magnetic body on the Z-axis.

In the present disclosure, the second scan operation may include scanning the magnetic body along the second scan path on the XY plane perpendicular to the Z axis at the first position of the magnetic body and receiving the second reflection signal reflected from the magnetic body.

The XY plane is a plane perpendicular to the Z-axis parallel to the longitudinal axis of the driving unit, and may refer to a plane in a three-dimensional space, including the Y-axis perpendicular to the longitudinal axis of the driving unit and the X-axis perpendicular to both of the axes.

In one embodiment of the present disclosure, the second scan operation may be performed by the desired current information of the electromagnetic coil controlling the field free point or the field free line generated by the electromagnetic coil.

In the present disclosure, the first position recognition operation may further include a calculation operation of calculating a second scan path.

In one embodiment of the present disclosure, the second scan path may refer to a path for recognizing the position of a magnetic body by moving a magnetic field free point or a field free line on an XY plane perpendicular to the Z-axis.

In one embodiment of the present disclosure, the second scan path may be a path for recognizing X-axis and Y-axis coordinates, which are positions of the magnetic material on the XY plane.

In the present disclosure, the second position recognition operation may include identifying the second position of the magnetic material on the XY plane by using the second reflection signal.

In one embodiment of the present disclosure, the second position may include information on the X-axis and Y-axis coordinates of the XY plane of the magnetic material.

In the present disclosure, the second position recognition operation may further include a current position recognition operation of identifying the current position of the magnetic body by using the first position and the second position.

In the present disclosure, the receiving operation may include receiving, by the RF coil unit, the reflection signal reflected from the magnetic body.

In one embodiment of the present disclosure, the first reflection signal may be a signal enabling, when the driving unit slides and drives the magnetic field generating unit in one axial direction, the current position of the magnetic body with respect to that axial direction to be identified.

In the present disclosure, the first scan operation may further include a first filtering operation of filtering the first reflection signal.

In the present disclosure, the second scan operation may further include a second filtering operation of filtering the second reflection signal.

In the present disclosure, the filtering operation may be performed using a LabVIEW modeling system.

Noise can be removed from the first reflection signal and the second reflection signal through the filtering operation, and through this, the current position of the magnetic body can be clearly displayed without a decrease in resolution.

In the present disclosure, the current position recognition operation may further include a projection operation of projecting the current position of the magnetic body onto a space to convert the same into 3D shape information.

In the present disclosure, the reflection signal may be received by an RF signal receiving device having an antenna.

In the present disclosure, the method of recognizing the position of the magnetic body may further include an operation of moving the magnetic body after the second position recognition operation.

In the present disclosure, the operation of moving the field free point or the field free line so that the magnetic force acts on the magnetic body to direct the magnetic body toward a target position.

In one embodiment of the present disclosure, the operation of moving the magnetic body may include moving the field free point to face a target position with reference to the magnetic body so that the magnetic force acts on the magnetic body to direct the magnetic body toward the target position.

In one embodiment of the present disclosure, the operation of moving the magnetic body may include rotating the field free point to form a certain angle ($\theta$) with the direction of the magnetic field vector of the field free line so that the magnetic force acts on the magnetic body to direct the magnetic body to a target position.

In one embodiment of the present disclosure, "so that the magnetic force acts" or "to act the magnetic force" indicates that when the magnetic body is located on a magnetic gradient near a field free point or a field free line, the magnetic body moves in the direction in which the magnetic force acts due to the magnetic force generated from the center of the field free point or the center line of the field free line.

Through this, the system and method of the present disclosure can drive a magnetic body and recognize the position thereof at the same time, thereby efficiently moving the magnetic body to a target position.

Advantageous Effects

The present disclosure relates to an integrated system for driving a magnetic body and recognizing the position thereof, and a method of recognizing the position of a magnetic body by using the same. According to the present disclosure, the position and shape of magnetic nanoparticles may be recognized by imaging the magnetic nanoparticles even with fewer coils, compared with the existing MPI scanner-based magnetic nanoparticle driving method. Therefore, a space for installing the system can be simplified, accessibility to a patient can be improved, and the driving and position recognition of a magnetic body can be achieved.

BRIEF DESCRIPTION OF THE DRAWINGS

FIG. 4a illustrates an equation for inducing a desired current for generating FFP or FFL at a specific position in a region of interest by a movable system for recognizing the position of a magnetic body according to the present disclosure.

FIG. 4b illustrates a formula operation flowchart for inducing desired currents of four electromagnetic coils to generate FFP or FFL.

FIGS. 11a, 11b, 11c, 11d and 11e show a principle of driving magnetic particles, a virtual view thereof, and an actual driving state thereof.

MODE FOR CARRYING OUT THE INVENTION

An integrated system for driving a magnetic body and recognizing the position thereof, the system including:
- a magnetic field generating unit including four electromagnetic coils spaced radially by the same distance, and a coil frame to which the electromagnetic coils are connected;
- an RF coil unit disposed in a through-hole included in a central portion of the coil frame;
- a driving unit orthogonal to the coil frame and connected to allow the coil frame to slide in one axial direction; and
- a processing unit configured to generate movement path information of the coil frame and desired current information of the electromagnetic coils,
- wherein the central axis of each of the four electromagnetic coils is directed toward the center of the coil frame, and
- the driving unit moves the coil frame according to the movement path information.

Hereinafter, the present disclosure will be described in more detail through drawings and examples. These drawings and examples are only for explaining the present disclosure in more detail, and it will be apparent to those skilled in the art that the scope of the present disclosure is not limited by these drawings and examples according to the gist of the present disclosure.

Figure 1:
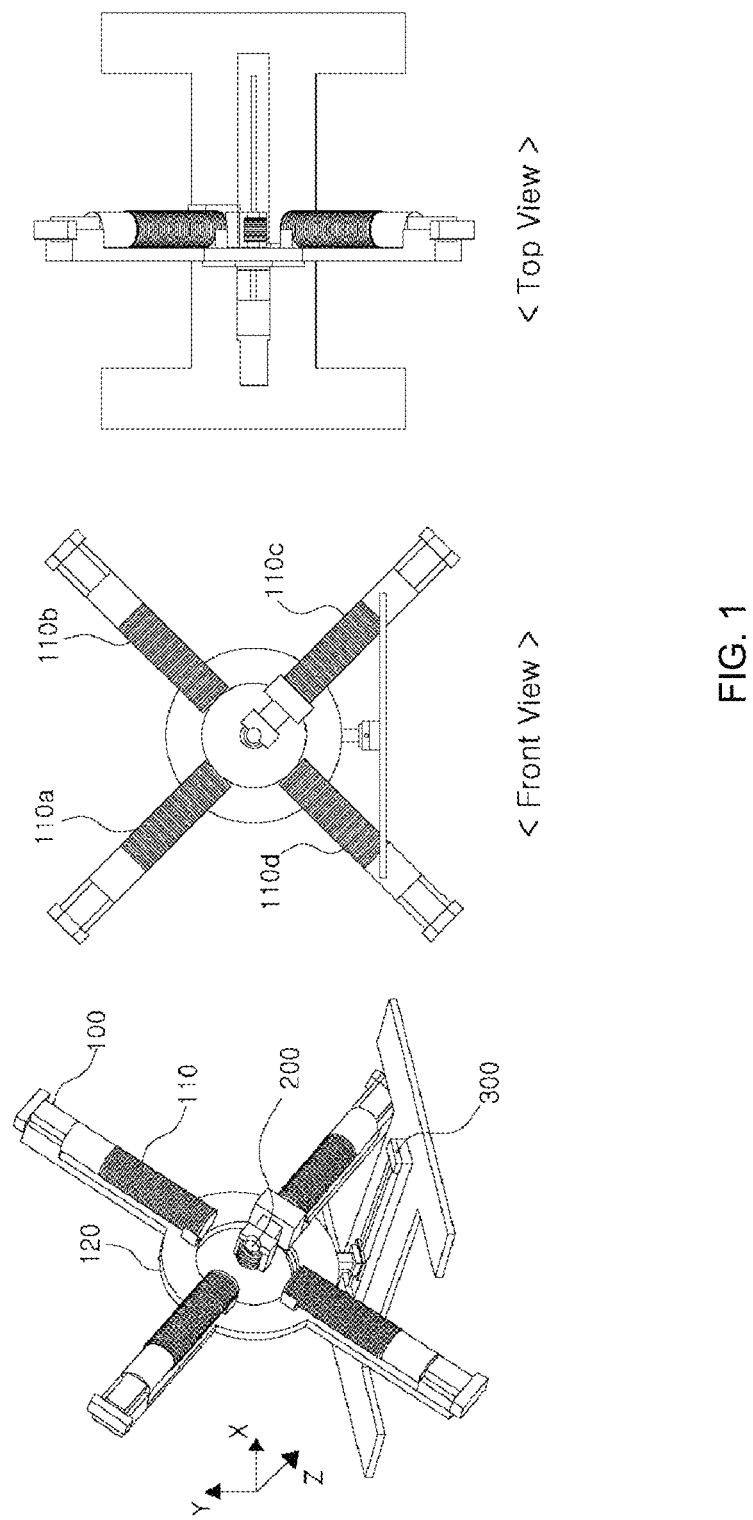
FIG. 1 illustrates a movable system for recognizing the position of a magnetic body, including four electromagnetic coils according to the present disclosure.

FIG. 1 illustrates a movable system for recognizing the position of a magnetic body, including four electromagnetic coils according to the present disclosure.

Referring to FIG. 1, the movable system for recognizing the position of a magnetic body according to the present disclosure may include: a magnetic field generating unit 100 including four electromagnetic coils 110 radially spaced apart by the same distance, and a coil frame 120 to which the electromagnetic coils 110 are connected; an RF coil unit 200 connected to the center of a through-hole of the coil frame 120; and a driving unit 300 orthogonal to the coil frame 120 and connected to allow the coil frame 120 to slide in one axial direction.

The electromagnetic coils 110 may be radially spaced apart by the same distance.

The overall shape of the coil frame 120 may be determined according to the arrangement of the electromagnetic coils 110, but is not limited to a specific shape.

The magnetic field generating unit 100 may include the electromagnetic coils 110 and a coil frame 120 to which the electromagnetic coils are connected.

The system of the present disclosure employs four electromagnetic coils 110. At this time, one electromagnetic coil 110 may form an angle of 90 degrees with another adjacent electromagnetic coil, but is not limited thereto.

The central axes of a first electromagnetic coil 110a, a second electromagnetic coil 110b, a third electromagnetic coil 110c, and a fourth electromagnetic coil 110d may be directed toward the center of the RF coil unit 200.

The RF coil unit 200 may include a receive coil (Rx-coil) 220 and a transmit coil (Tx-coil) 210. At this time, the receive coil 220 may overlap the inner circumferential surface of the transmit coil 210.

In addition, the RF coil unit 200 may be disposed at the center of the coil frame 120.

In one embodiment of the present disclosure, the RF coil unit 200 may be connected to one side of a through-hole provided in the center of the coil frame 120.

The driving unit 300 may be orthogonal to the coil frame 120 and connected to allow the coil frame 120 to slide in one axial direction. The driving unit 300 may be equipped with a separate motor and gear, and may move in one axial direction such as forward and backward or left and right. FIG. 1 shows that the driving unit 300 is connected to the coil frame 120 to be slidable in one axial direction which is the Z-axis direction.

A processing unit that generates a movement path of a field free point (FFP) or field free line (FFL) may be included in an integrated system for driving a magnetic body and recognizing the position thereof or may be included in a separate device, but is not limited thereto.

Figure 2:
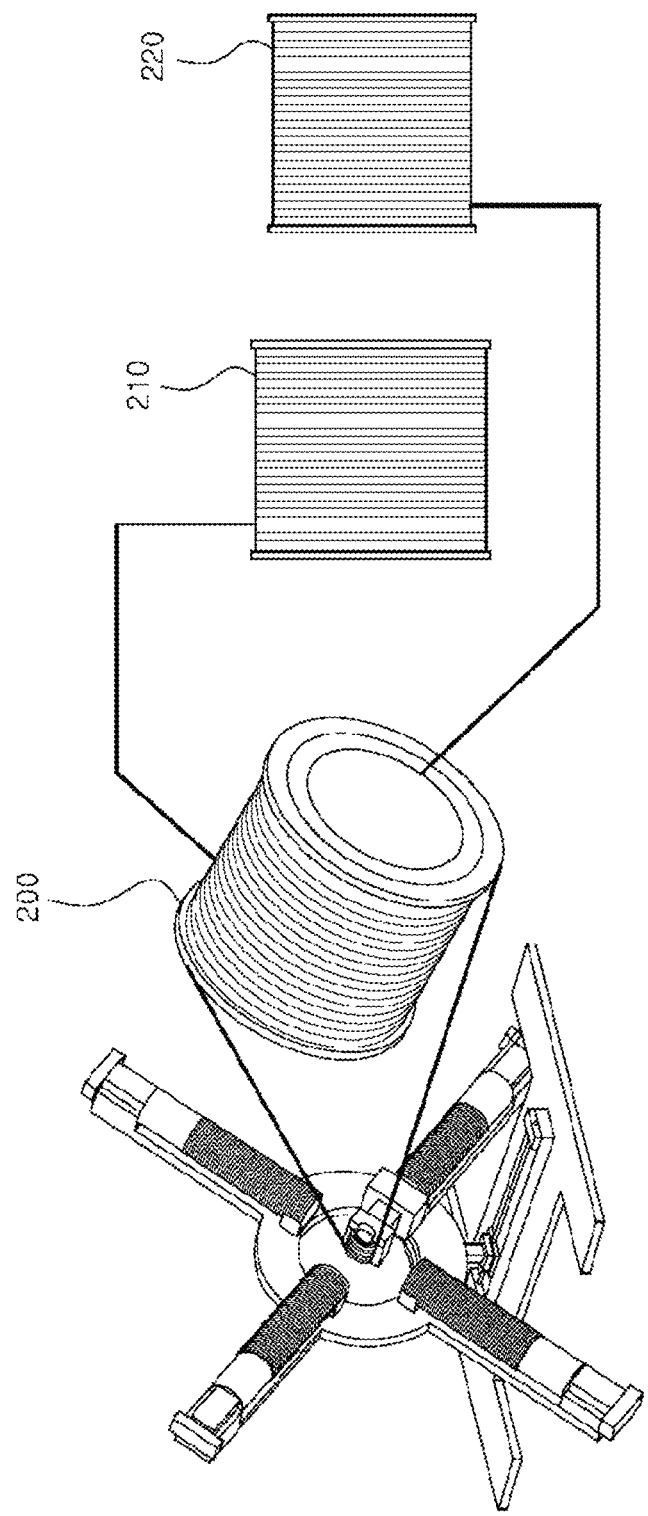
FIG. 2 illustrates a detailed configuration of an RF transmit/receive coil included in a movable system for recognizing the position of a magnetic body according to the present disclosure.

In addition, the detailed configuration of the RF transmit/receive coil included in the movable system for recognizing the position of a magnetic body is shown in FIG. 2.

Referring to FIG. 2, the RF coil unit 200 may be configured such that the receive coil (Rx-coil) 220 overlaps an inner circumferential surface of the transmit coil (Tx-coil) 210. The RF coil unit 200 may be connected to one side of a through-hole provided in the center of the coil frame 120. That is, the RF coil unit 200 may be included in the center of the coil frame 120.

Figure 3A:
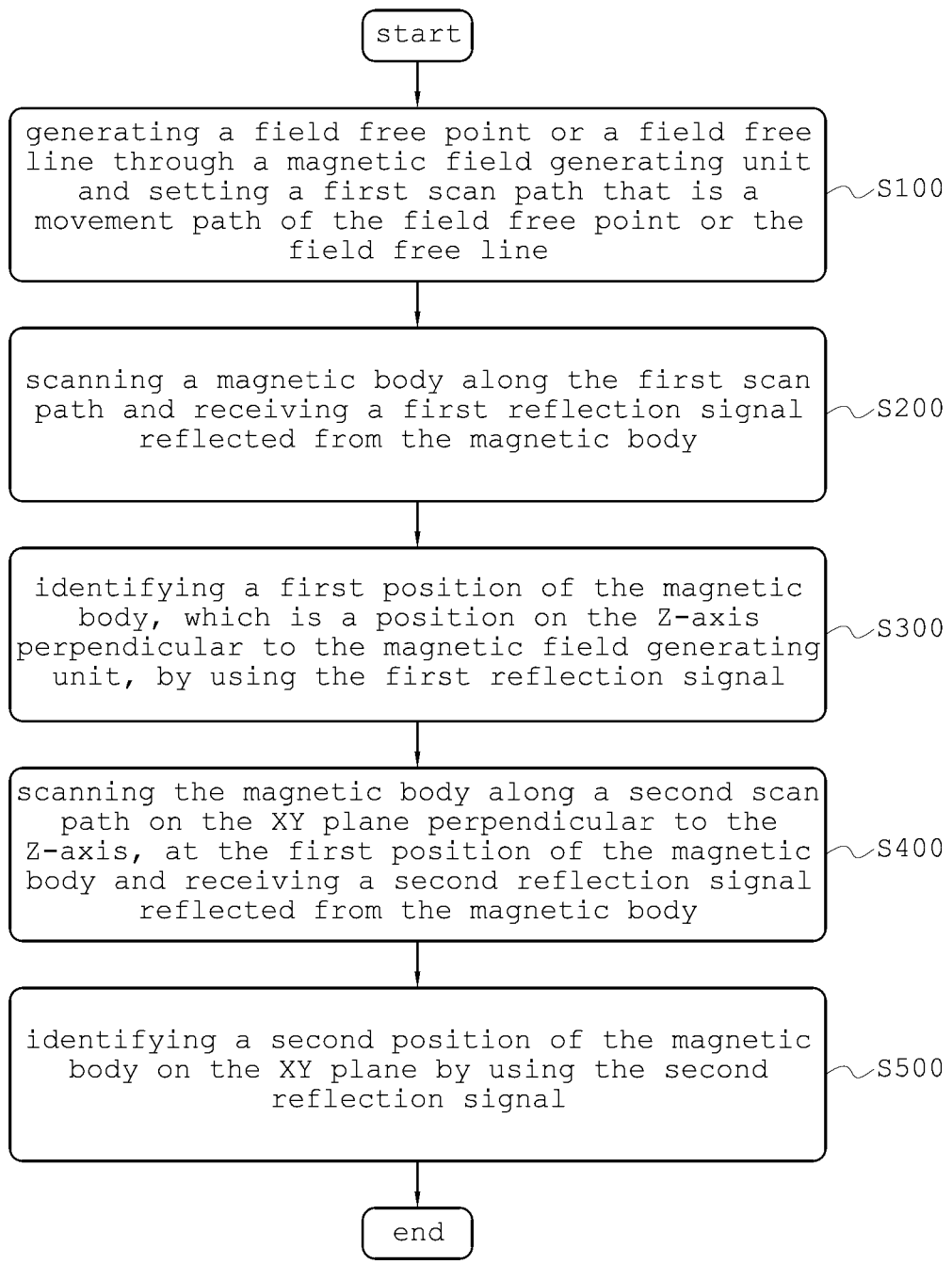
FIGS. 3a and 3b are an overall flowchart of a method of recognizing the position of a magnetic body according to the present disclosure.
Figure 3B:
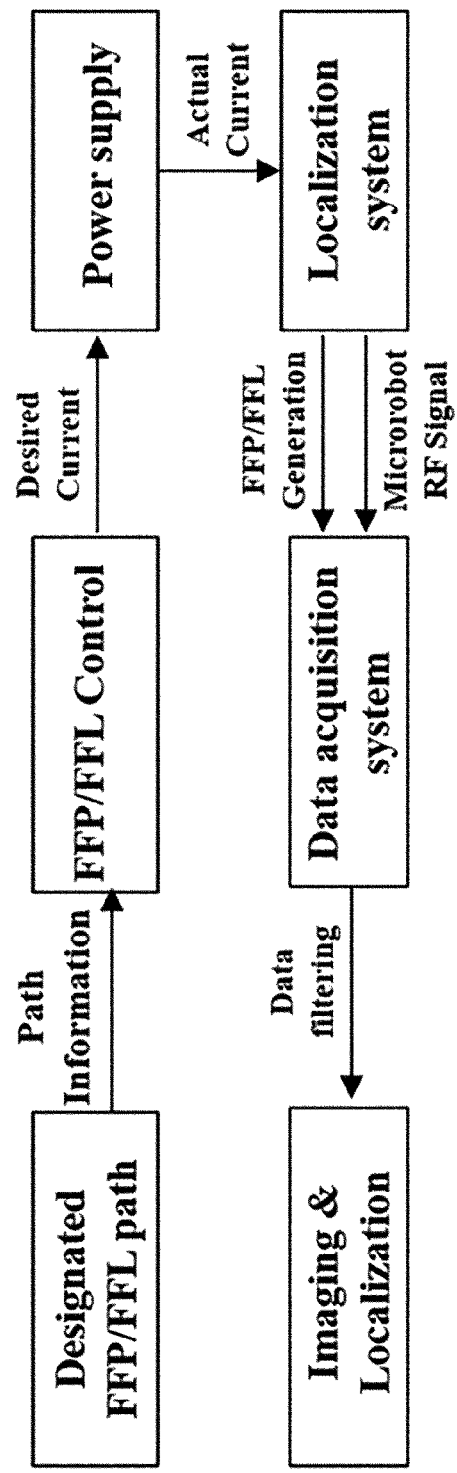

An overall flowchart of a method of recognizing the position of a magnetic body according to the present disclosure is shown in FIGS. 3A and 3B.

Referring to FIGS. 3A and 3B, a movement path to be scanned by a field free point (FFP) or field free line (FFL) is set first within a region of interest (ROI). Various calculations for setting a movement path may be performed by a processing unit (not shown).

When FFP or FFL path information is input to an FFP/FFL controller, the processing unit may generate a desired current for controlling the FFP or FFL. The desired current is applied to the movable system for recognizing the position of a magnetic body through the power supply to generate FFP or FFL.

Depending on the movement path of the FFP/FFL, a magnetic body such as a microrobot (magnetic particles) exhibits a different degree of magnetization and receives a reflection signal reflected from the magnetic body. Since the reflected signal includes the movement path of the FFP/FFL and RF transmit/receive signal information of the microrobot (magnetic particles), the position and shape of the magnetic particles may be recognized by synchronizing the same.

FIG. 4A relates to a formula for deriving desired current for generating FFP or FFL at a specific position in a region of interest by a movable system for recognizing the position of a magnetic body. In addition, FIG. 4b illustrates flowchart of a formula operation for inducing desired current of the four electromagnetic coils to generate FFP or FFL.

FFP (field free point) represents a point in the magnetic field where the magnetic force is zero. In the position recognition system of the present disclosure, while the driving unit slides and drives the magnetic field generating unit in the Z-axis direction, a coupling coil including a transmit coil (Tx coil) and a receive coil (Rx coil) located in a region of interest (ROI) receives and measures the magnetic field signal reflected by the magnetic nanoparticles, thereby recognizing the position of the magnetic nanoparticles (MNPs). Scanning may be performed using FFP control through which a position indicating the maximum magnetic field strength is determined, thereby acquiring an image.

The three-dimensional spatial position of the magnetic nanoparticle is determined by combining and reconstructing the scanning results of the XY plane image and the Z-axis position of the magnetic nanoparticle recognized while being slid and driven in the Z-axis direction.

To this end, the magnetic force (F) applied to the surface of the magnetic body by the electromagnetic coil may be expressed as Equation 1 below, $$F = \nabla(M \cdot \nabla)E, \quad \text{[Equation 1]}$$

wherein, M indicates the magnetization value of the magnetic body, and ∇ indicates the gradient of the magnetic field.

The general formula for the strength of the magnetic field H (unit A/m) and the magnetic flux density B may be expressed as Equation 2 below, $$B = \mu_0 \mu_r H, \quad \text{[Equation 2]}$$

wherein μ0 indicates the constant 4π10−7N/A2, and represents the permeability of the magnetic body in free space. μr indicates the permeability of the magnetic body. The strength (H) of the magnetic field may be derived from the current transmitted through the wire, according to the Biot-Savart law. The magnetic force may be expressed as a component of Equation 3 below along each spatial direction.

$$F = \nabla \begin{bmatrix} \frac{\partial B_x}{\partial x} & \frac{\partial B_y}{\partial x} & \frac{\partial B_z}{\partial x} \\ \frac{\partial B_x}{\partial y} & \frac{\partial B_y}{\partial y} & \frac{\partial B_z}{\partial y} \\ \frac{\partial B_x}{\partial z} & \frac{\partial B_y}{\partial z} & \frac{\partial B_z}{\partial z} \end{bmatrix} \begin{bmatrix} M_x \\ M_y \\ M_z \end{bmatrix} \quad \text{[Equation 3]}$$

Since the magnetic flux density B that can determine the FFP at a desired position is a controllable parameter in Equation 1, the magnetic flux density of one coil generating a magnetic field at a desired position (x, y, z) in the region of interest (ROI) may be defined first according to Equation 4 below. At this time, the applied current (I) is [i1 i2 i3 i4]T.

$$B(x,y,z) = \hat{B}(x,y,z)I \quad \text{[Equation 4]}$$

The magnetic flux density at a specific position (x, y, z) may be expressed as in Equation 5 below using the magnetic field superposition characteristics for the four magnetic fields induced by the four coils on the position recognition system of the present disclosure.

$$B(x,y,z) = \begin{bmatrix} B_x \\ B_y \\ B_z \end{bmatrix} = \begin{bmatrix} \hat{B}_{x,1}(P) & \hat{B}_{x,2}(P) & \hat{B}_{x,3}(P) & \hat{B}_{x,4}(P) \\ \hat{B}_{y,1}(P) & \hat{B}_{y,2}(P) & \hat{B}_{y,3}(P) & \hat{B}_{y,4}(P) \\ \hat{B}_{z,1}(P) & \hat{B}_{z,2}(P) & \hat{B}_{z,3}(P) & \hat{B}_{z,4}(P) \end{bmatrix} \begin{bmatrix} i_1 \\ i_2 \\ i_3 \\ i_4 \end{bmatrix} = \begin{bmatrix} \hat{B}_x(P) \\ \hat{B}_y(P) \\ \hat{B}_z(P) \end{bmatrix} I, \quad \text{[Equation 5]}$$

wherein "P=(x, y, z)" indicates the position of the calculated point. In addition, similar to the method of expressing the magnetic flux density by Equation 3, if the magnetic force is partially differentiated in each direction, the position may be expressed by Equation 6.

$$\frac{\partial B(P)}{\partial x} = \begin{bmatrix} \frac{\partial \hat{B}_1(P)}{\partial x} & \frac{\partial \hat{B}_2(P)}{\partial x} & \frac{\partial \hat{B}_3(P)}{\partial x} & \frac{\partial \hat{B}_4(P)}{\partial x} \end{bmatrix} \begin{bmatrix} i_1 \\ i_2 \\ i_3 \\ i_4 \end{bmatrix} = \frac{\partial \hat{B}(P)}{\partial x} I$$

$$\frac{\partial B(P)}{\partial y} = \begin{bmatrix} \frac{\partial \hat{B}_1(P)}{\partial y} & \frac{\partial \hat{B}_2(P)}{\partial y} & \frac{\partial \hat{B}_3(P)}{\partial y} & \frac{\partial \hat{B}_4(P)}{\partial y} \end{bmatrix} \begin{bmatrix} i_1 \\ i_2 \\ i_3 \\ i_4 \end{bmatrix} = \frac{\partial \hat{B}(P)}{\partial y} I$$

$$\frac{\partial B(P)}{\partial z} = \begin{bmatrix} \frac{\partial \hat{B}_1(P)}{\partial z} & \frac{\partial \hat{B}_2(P)}{\partial z} & \frac{\partial \hat{B}_3(P)}{\partial z} & \frac{\partial \hat{B}_4(P)}{\partial z} \end{bmatrix} \begin{bmatrix} i_1 \\ i_2 \\ i_3 \\ i_4 \end{bmatrix} = \frac{\partial \hat{B}(P)}{\partial z} I \quad \text{[Equation 6]}$$

The gradient terms derived from Equation 6 may be used to express Equation 1 related to the magnetic force as shown in Equation 7 below, $$F = \nabla \begin{bmatrix} \frac{\partial B(P)}{\partial x} & \frac{\partial B(P)}{\partial y} & \frac{\partial B(P)}{\partial z} \end{bmatrix}^T \quad \text{[Equation 7]}$$

$$M = \nabla \begin{bmatrix} M^T \frac{\partial \hat{B}(P)}{\partial x} \\ M^T \frac{\partial \hat{B}(P)}{\partial y} \\ M^T \frac{\partial \hat{B}(P)}{\partial z} \end{bmatrix} I,$$

wherein M indicates [Mx My Mz]T.

Then, the two governing equations Equation 3 and Equation 7 are combined to calculate the magnetic field of the region of interest. Therefore, the primary equation may be expressed as Equation 8 below, $$D = \begin{bmatrix} B(P) \\ M^T G_x(P) \\ M^T G_y(P) \\ M^T G_z(P) \end{bmatrix} \begin{bmatrix} i_1 \\ i_2 \\ i_3 \\ i_4 \end{bmatrix} = M_u(P)I \quad \text{[Equation 8]}$$

wherein "D=[B F]T" represents a desired matrix, and "Mu ∈ R12×4" represents an identity matrix corresponding to four electromagnetic coils in the range of the region of interest. In order to calculate the input current value of Equation 8, a matrix inversion is applied to Mu, and a pseudo inversion is applied to obtain a current matrix through Equation 9 below.

$$I = M_u^+ D, \quad \text{[Equation 9]}$$

wherein Mu+ represents the pseudo inverse matrix of Mu obtained through simulation by COMSOL Multiphysics (COMSOL Group Sweden), based on the same physical conditions of the electromagnetic coil including the number of wire windings and scale. Here, COMSOL is generally utilized for magnetic field analysis based on the finite element method.

It is assumed that the region of interest in the position recognition system of the present disclosure is 20×20 mm2, and the interval of FFP along each axis of XYZ is 1 mm. That is, a total of 441 unit matrix entities were collected through basic data calculations for current values. The dependence expressed by Equation 9 may be used to manipulate the magnetic torque and magnetic force to control the movement of the magnetic body in the region of interest.

In order to derive the FFP at a predetermined point through this strategy, the term B (P) related to the desired matrix in Equation 10 was set to 0, which represents a magnetic gradient strength value of the given nonlinear magnetization curve and allows the capturing of the advantage of particle signal. Then, the desired matrix may be expressed as follows using Equation 8, $$D=[B_x B_y B_z G_{xx} G_{xy} G_{xz} G_{yx} G_{yy} G_{yz} G_{zx} G_{zy} G_{zz}]^T,$$

wherein the values of Bx, By, and Bz are regarded as 0. Additional theory for FFP operation may be obtained from Maxwell's equations with the constraint Gxx+Gyy+Gzz=0.

In addition, using Equation 10, the FFL in the region of interest may be derived in item G by inputting the magnetic gradient strength value to the direction coordinates (xx, xy, xz, . . . ) in which FFL is desired to be generated.

Figure 5:
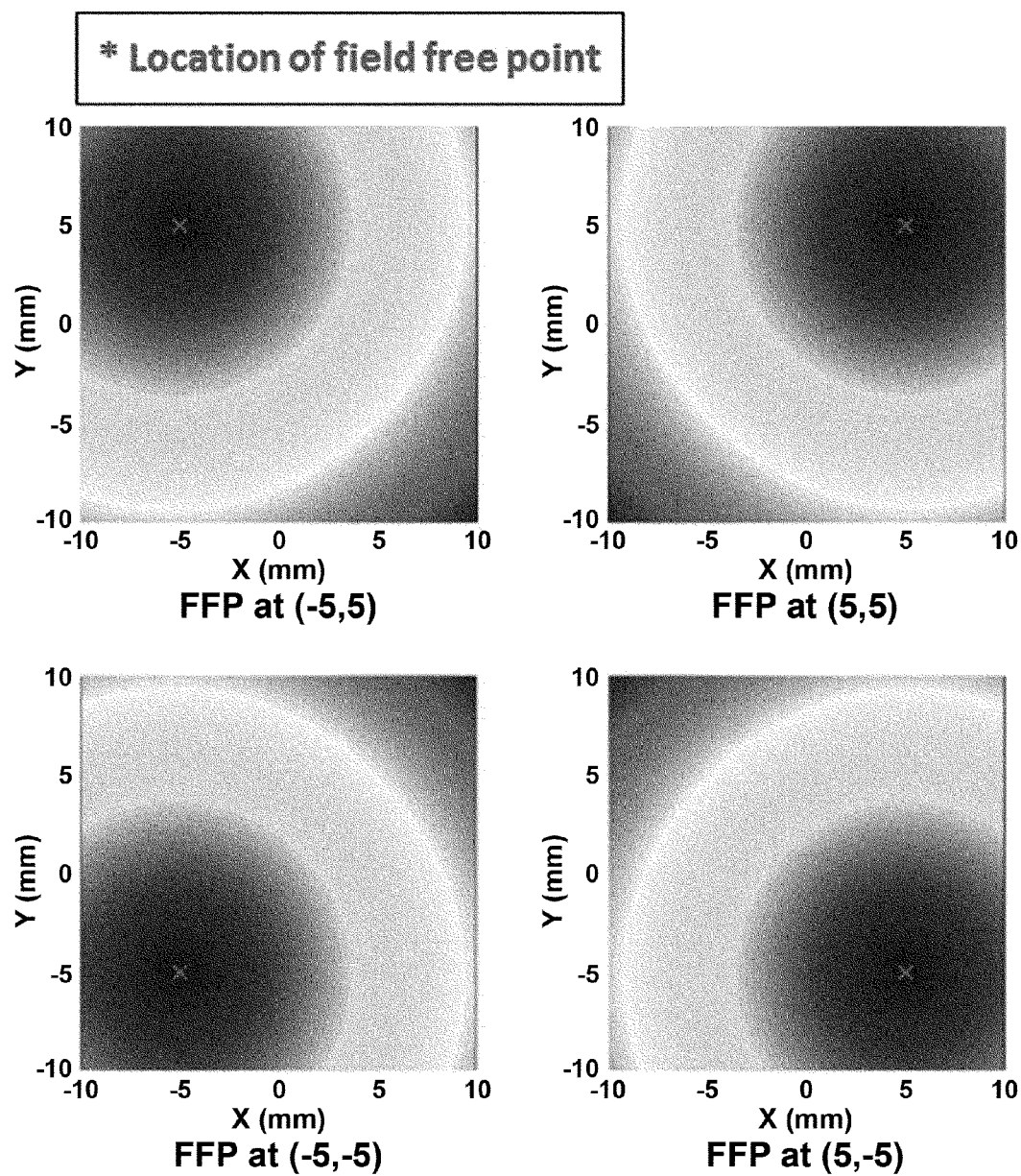
FIG. 5 shows that FFPs are actually generated at specific positions by a movable system for recognizing the position of a magnetic body.

Referring to FIG. 5, the field free point on the XY plane obtained from COMSOL may be identified. FIG. 5 shows that there are FFPs at points (−5, 5), (5, 5), (−5, −5), and (5, −5). In the present disclosure, Gxx, Gyy, and Gzz may be replaced with −αGzz, (α−1)Gzz, and Gzz, wherein a satisfies α∈(0, 1). In addition, α is set to ½.

$$\nabla \cdot B = 0 \quad \text{[Equation 11]}$$

To evaluate the accuracy of the proposed method, the FFP control method was simulated at all points within the region of interest. However, the desired FFP position did not closely match the FFP positions simulated at various points within the region of interest. In addition, as noted from the case in which the current value obtained through Equation 9 is replaced with that obtained through Equation 8 to identify the loss of the magnetic field, Bx, By, and Bz remain at values other than 0. In order to prevent the FFP position from being misplaced within the region of interest, a weighted-norm solution based on least-squares solutions was applied to minimize the error norm in the linear equation.

$$I = Q_0^{-1} M_u^+ D, \quad \text{[Equation 12]}$$

wherein I, Mu, D, and Q0 satisfy I∈Rn, Mu∈Rm×n, D∈Rm, and Q0∈Rm×m, respectively, and Mu is the square root of Q used for weighted-norm.

When the desired current to be applied to the four electromagnetic coils is [i1 i2 i3 i4] T, the desired current may be the current calculated by Equation 13 below.

$$I = Q_0^{-1} M_u^+ D = [i_1 i_2 i_3 i_4]^T \quad \text{[Equation 13]}$$

In addition, Q0 and Q are related by Equation 14 below.

$$Q = Q_0^T Q_0 \quad \text{[Equation 14]}$$

To construct a weighted diagonal matrix Q0−1, a diagonal matrix Wdig∈ R3×3 (including W1, W2, and W3) is added to the constraints Bx, By, and Bz as shown in Equation 15 below.

$$Wdig = \begin{bmatrix} W_1 & 0 & 0 \\ 0 & W_2 & 0 \\ 0 & 0 & W_3 \end{bmatrix}, \quad \text{[Equation 15]}$$

wherein the completed form of Q0−1∈ R12×12 is as shown in Equation 16 below.

$$Q_0^{-1} = \begin{bmatrix} W_{dig} & 0 \\ 0 & I_{dig} \end{bmatrix}, \quad \text{[Equation 16]}$$

wherein Idig satisfies Idig∈ R9×9.

This was schematized and shown in FIGS. 4a and 4b.

Meanwhile, to evaluate the performance of the proposed method based on the weighted-norm method, the minimum value required to obtain the FFP at the exact desired position was identified by increasing the value of the weight component of Wdig. During the evaluation, it was assumed that all weight variables in the weight matrix share the same value. The observed distance error of the FFP located at (8, 0) within the region of interest is shown in Table 1.

TABLE 1

| Number of Points | 30 | 50 | 90 | 141 |
|---|---|---|---|---|
| Error (mm) | 7 | 6.4 | 1.4 | 0 |

As noted from Table 3, as the number of points used in the weighted-norm method increases, the distance error at the desired FFP position tends to decrease, and the number of points allowing FFP driving without distance error is 141.

However, in spite of the selected 141 points, inaccurate positions of the FFP were observed at the edge of the region of interest. To solve this problem, the number of points was increased to 1,000 to ensure accurate position of the FFP in the entire region of interest.

Example 1. Generation of Field Free Points or Field Free Lines

Figure 6:
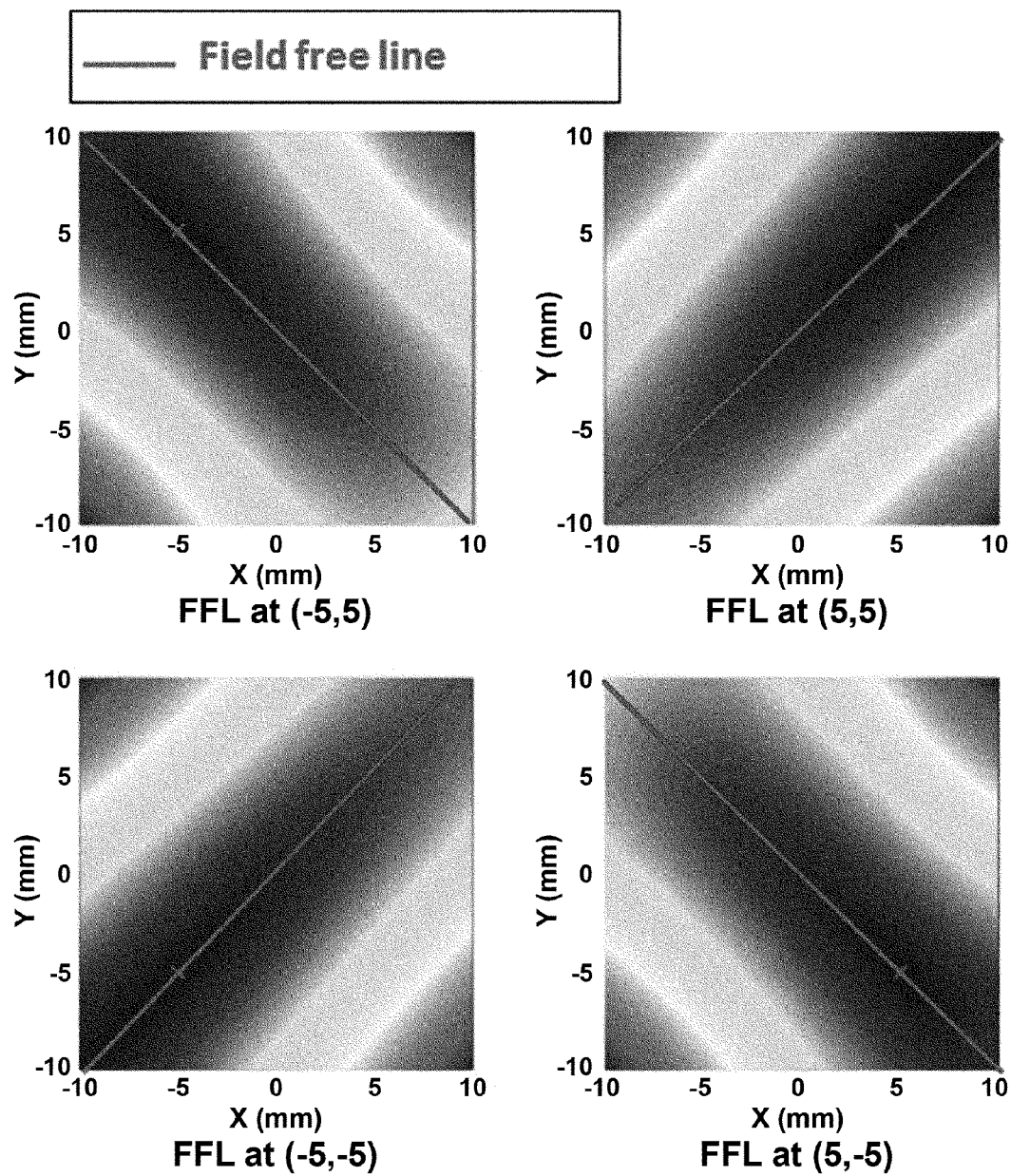
FIG. 6 shows that FFLs are actually generated at specific positions by a movable system for recognizing the position of a magnetic body.

FIG. 5 shows that an FFP is actually generated at a specific position by a movable system for recognizing the position of a magnetic body, and FIG. 6 shows that the FFL is actually generated. Here, the positions of FFP and FFL are indicated by a red X mark and a red line, respectively.

Referring to FIG. 5, the field free point is generated at (x, y)=(−5, 5), (5, 5), (−5, −5) or (5, −5) points on the XY plane.

Referring to FIG. 6, the field free lines are generated in directions of 45 degrees (or 225 degrees) and 135 degrees (or 315 degrees) on the XY plane.

Example 2. Recognition of Position of a Magnetic Body by Using Field Free Point or Field Free Line FIG. 7 is an overall flowchart for recognizing the position and shape of a magnetic body by using a mobile magnetic body position recognition system.

Figure 7:
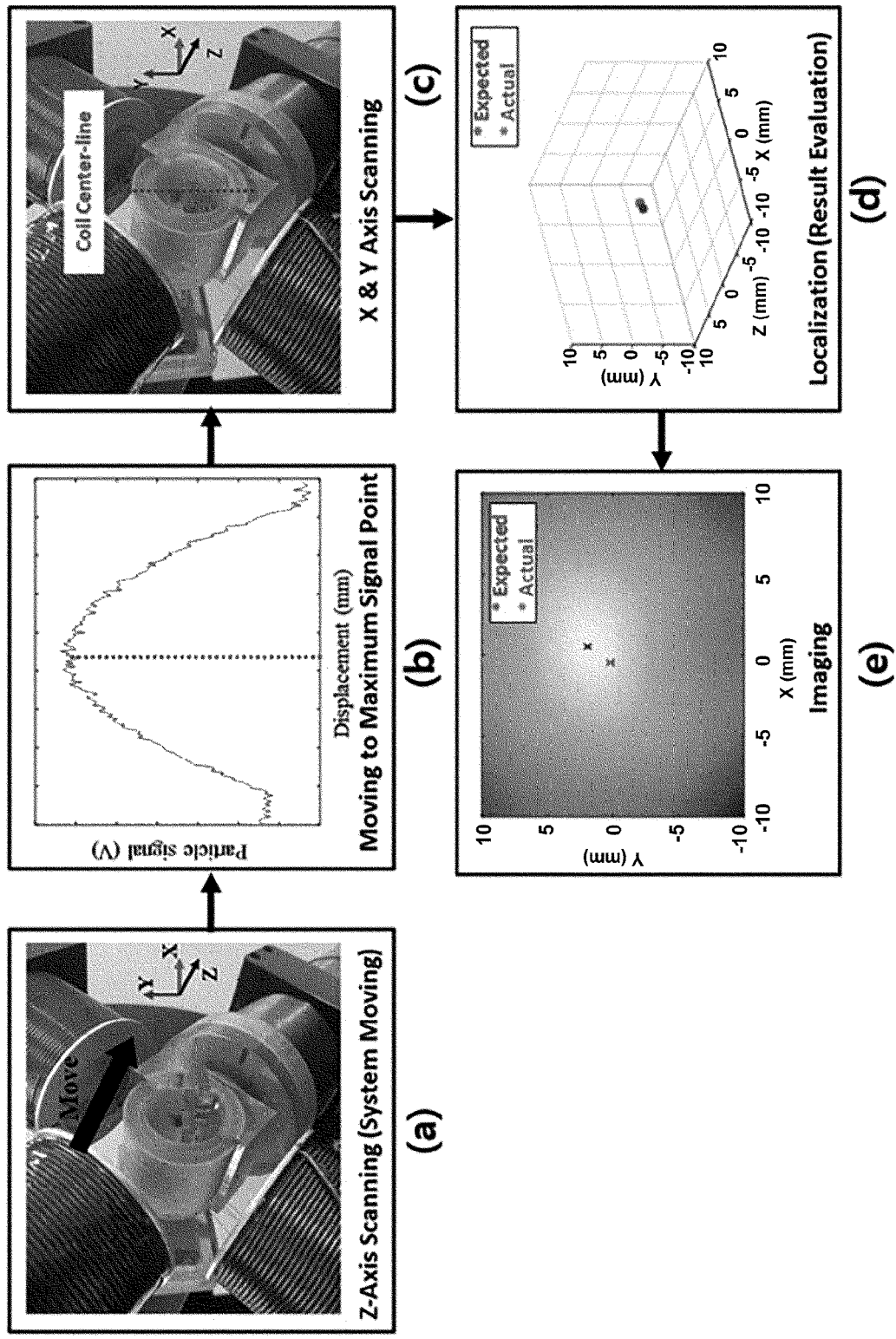
FIG. 7 illustrates an overall flowchart of recognizing the position and shape of a magnetic body by using a movable system for recognizing the position of a magnetic body.

Referring to FIG. 7, (a) first, in the movable system for recognizing the position of a magnetic body, the driving unit moves, in the Z-axis direction, the coil frame having the electromagnetic coil mounted thereon, and obtains an RF reflection signal reflected by magnetic particles with respect to the magnetic field of the electromagnetic coil.

(b) When the distance between the magnetic particles of the electromagnetic coil becomes the shortest, the magnitude of the RF signal becomes maximum. Accordingly, the position of the magnetic particle on the Z axis may be identified.

(c) Thereafter, the RF reflection signal of the magnetic particles is obtained by moving and scanning once the FFP or FFL on the X-Y plane.

(d) In other words, the position information of the magnetic particles on the X-axis and Y-axis in the X-Y plane is obtained based on the Z-axis magnetic particle position information, and consequently, the (X, Y, Z) coordinates of the magnetic particle in the 3-dimensional space may be recognized.

(e) In addition, the RF signal information on each axis shows a Gaussian distribution, and 3D shape information can be obtained by projecting the same onto a space.

Figure 8A:
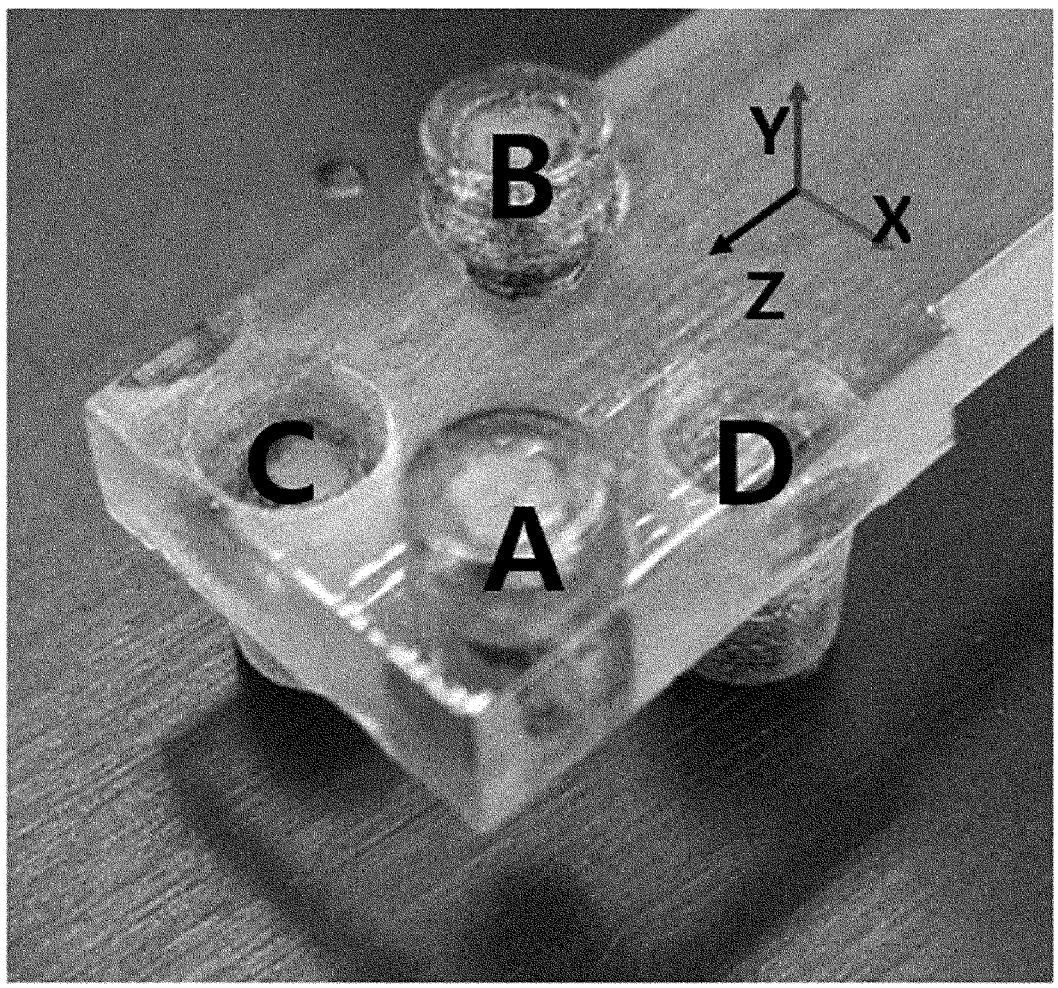
FIGS. 8a to 8b show that magnetic particles included in points (A, B, C, and D) having different three-dimensional positions in a phantom are recognized.
Figure 8B:
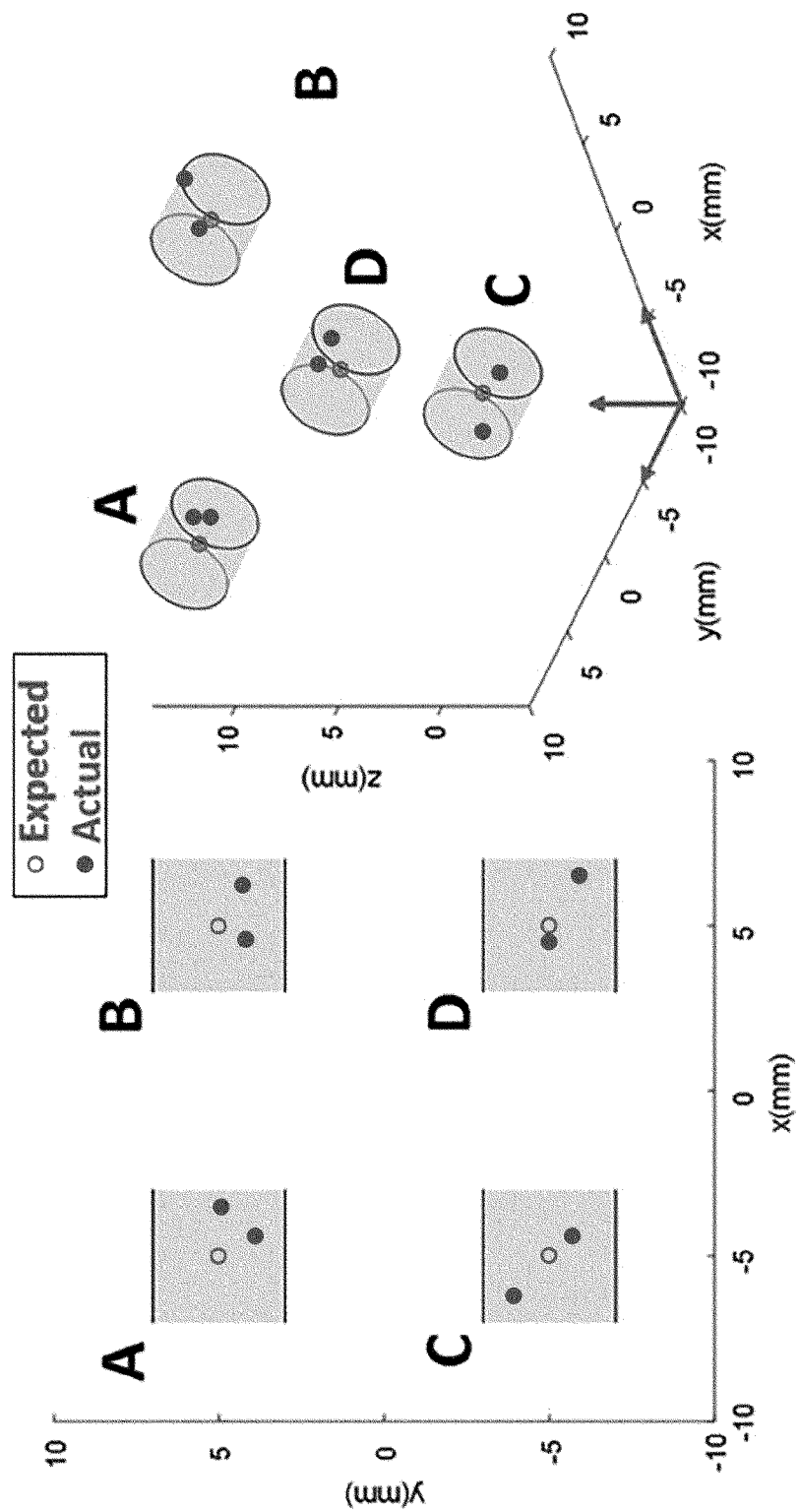

FIGS. 8a to 8b show that, based on the method described with reference to FIG. 7, 60 μl of magnetic particles (ferrofluid, EMG707) are placed in a phantom to be supported in four points (A, B, C, D) having different three-dimensional positions, and the position of the magnetic particles at each point is recognized through the movable system for recognizing the position of a magnetic body.

Referring to FIGS. 8A and 8B, (a) shows the appearance of the phantom, (b) shows the result of 2D position recognition, and (c) shows the result of 3D position recognition.

The measurement errors calculated at the four points are shown in Table 2.

TABLE 2

| Points | Error (mm) |
| --- | --- |
| A | 1.4 |
| B | 1.5 |
| C | 1.4 |
| D | 1.4 |

As noted from Table 2, the error at point A was 1.4 mm, 1.5 mm at point B, 1.4 mm at point C, and 1.4 mm at point D, and overall, the average error range of the position recognition performance was 1.4 mm.

Figure 9A:
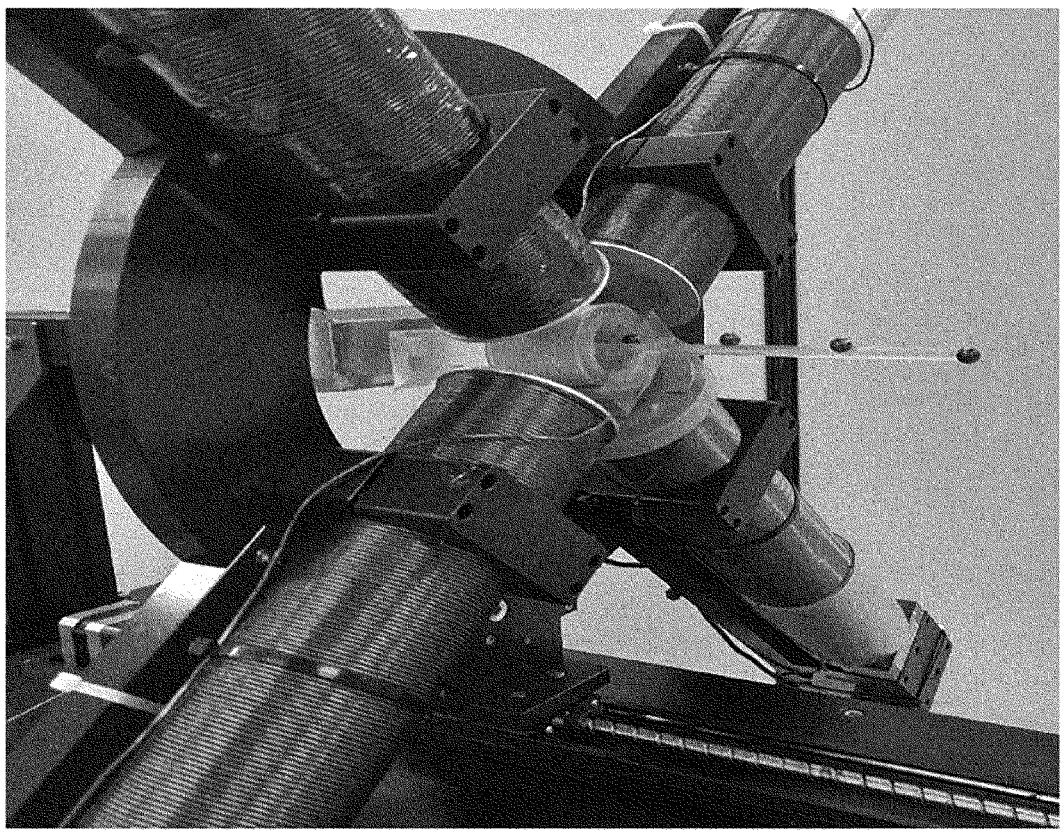
FIGS. 9a to 9b illustrate states in which magnetic particles included in points (A, B, C, and D) having different three-dimensional positions in a phantom and spaced apart at 10 cm intervals are recognized.
Figure 9B:
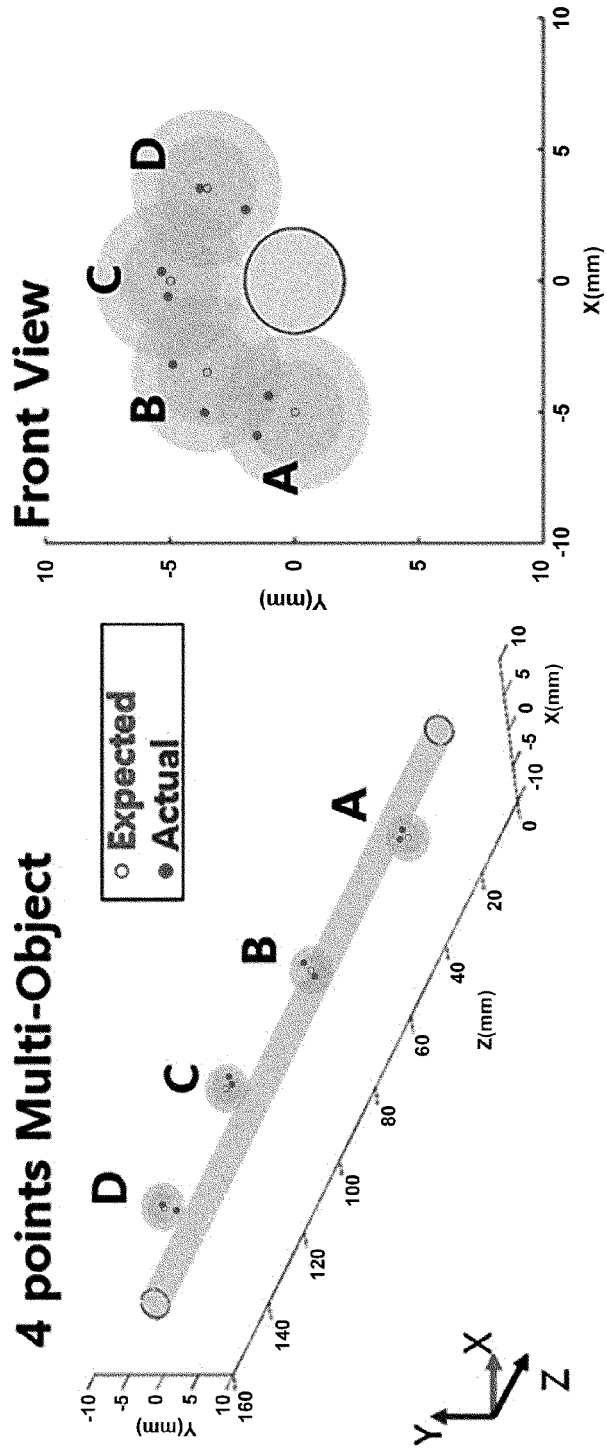

FIGS. 9A to 9B show the position of the magnetic particles at each point, recognized by arranging four points (A, B, C, D) supporting magnetic particles having different three-dimensional positions, at intervals of 10 cm in the Z-axis direction.

Referring to FIGS. 9A and 9B, (a) shows the recognized position of the magnetic particles, (b) shows the result of 2D position recognition, and (c) shows the result of 3D position recognition.

Measurement errors calculated at four points are shown in Table 3.

TABLE 3

| Points | Error (mm) |
| --- | --- |
| A | 0.8 |
| B | 2.6 |
| C | 1.9 |
| D | 1.8 |

As noted from Table 3, the error at point A was 0.8 mm, 2.6 mm at point B, 1.9 mm at point C, and 1.8 mm at point D, and overall, the average error range of the position recognition performance was 1.775 mm.

Figure 10:
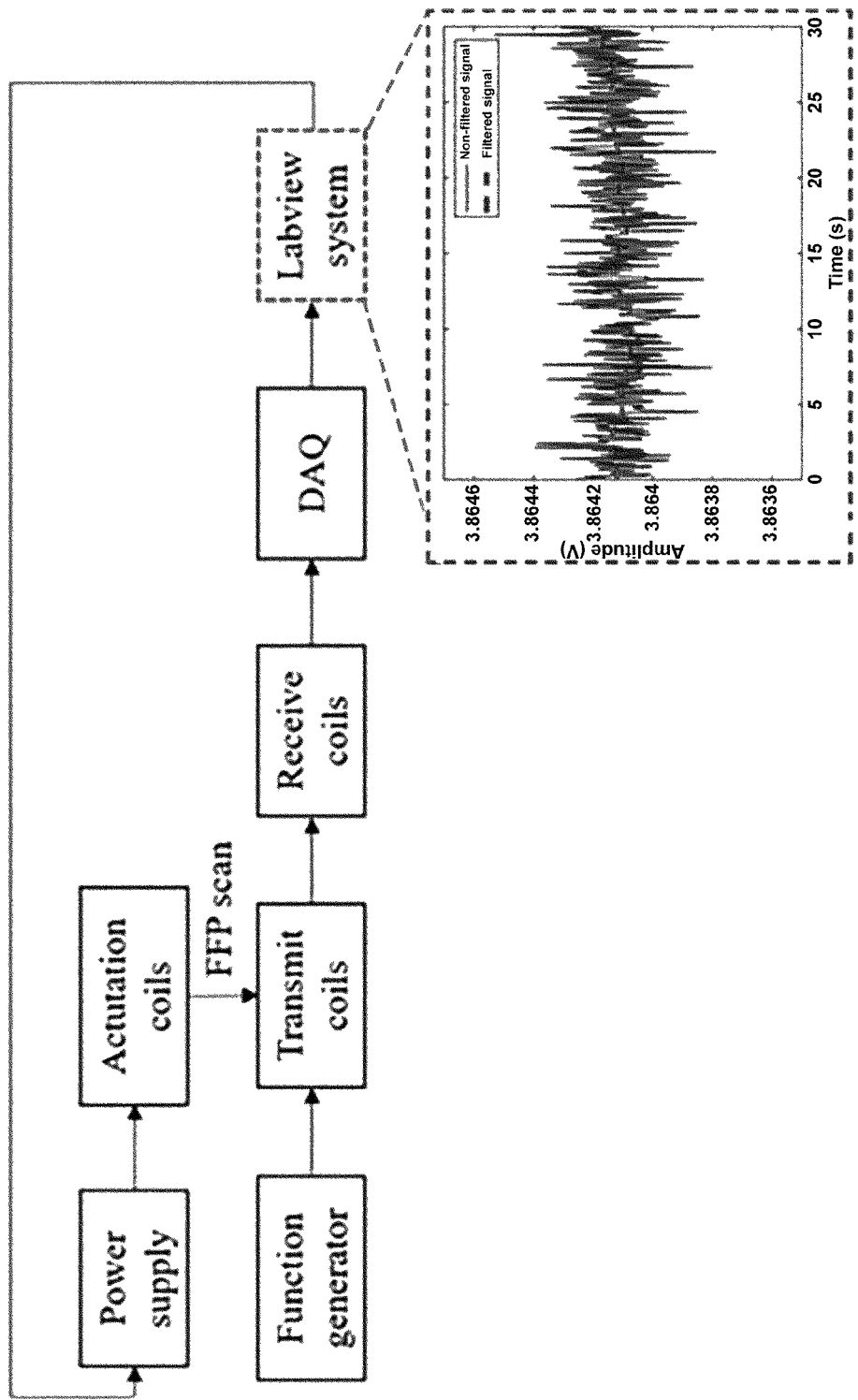
FIG. 10 illustrates a filtering process using a LabVIEW system to reduce noise of an RF reflection signal.

In order to process signals collected by FFP scanning accompanied by noise due to the configuration of hardware, such as an RF coil, digital filtering was performed through the LabVIEW system shown in FIG. 10.

A moving average filter was used to reduce the fundamental fluctuation width of the signals, and the filtered signals were corrected using Savizky-Golay's least-squares fitting method so as to produce smoother data without loss of resolution.

Example 3. Drive of Magnetic Body

The movable coil system of the present disclosure has four coils parallel to the XY plane. Thus, when generating a field free point in the region of interest, as shown in in FIG. 11, a magnetic field (Binternal) directed outward from the center of the field free point exists due to the difference in magnetic field strength, and a magnetic field (Bexternal) directed to the center of the field free point exists due to the difference in magnetic field strength between the outer region of the coil system where the magnetic field almost does not exist and the end portion of the region of interest where the magnetic free point affects. Since the above two magnetic fields act in opposite directions to each other, when the magnetic body is located at the boundary of the two magnetic fields, the magnetic body may be driven in the Z-axis direction while being fixed to the boundary.

Figure 11A:
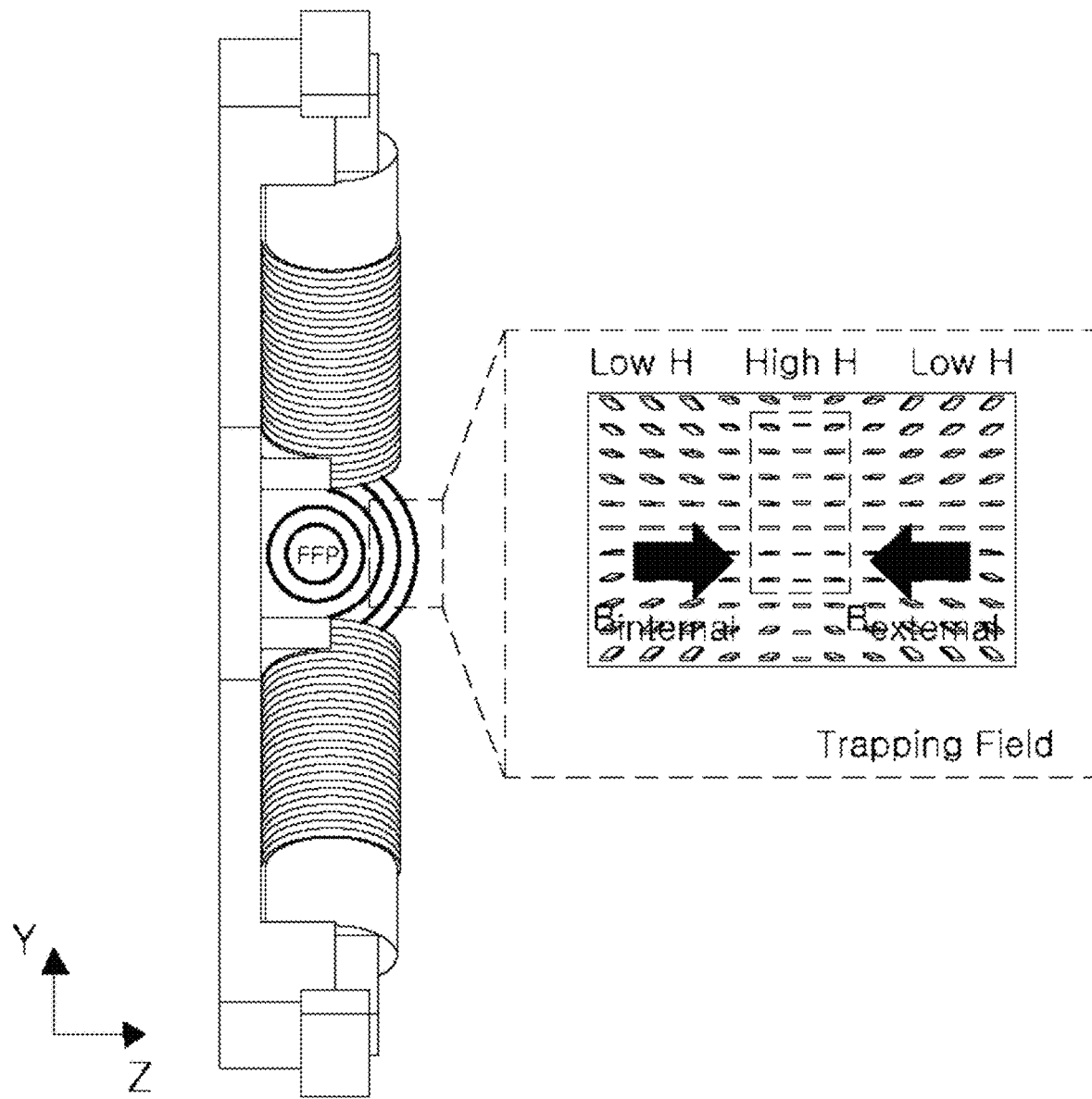

Referring to FIG. 11B, the actual driving of the magnetic particles (Ferrofluid) at the Z-axis was identified. T1 to T3 indicate that the magnetic particles are moving toward the Y-shaped branch point of the phantom, and T4 to T6 indicate that the magnetic particles are being pulled in the opposite direction.

Figure 11C:
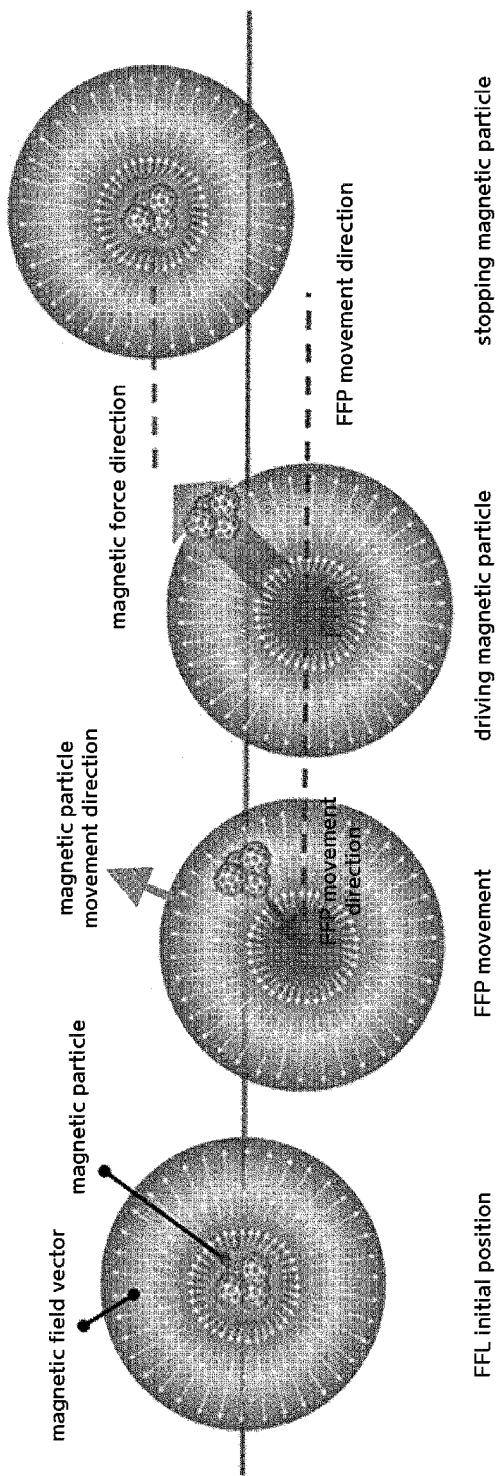

Referring to FIG. 11C, when a field free point (FFP) is positioned to face the movement direction of the magnetic body (magnetic particles), based on the initial position of the magnetic particles, the magnetic force acts on the magnetic body such that the magnetic body faces in the movement direction. Using the magnetic force, the magnetic body can be driven to a target point.

Figure 11D:
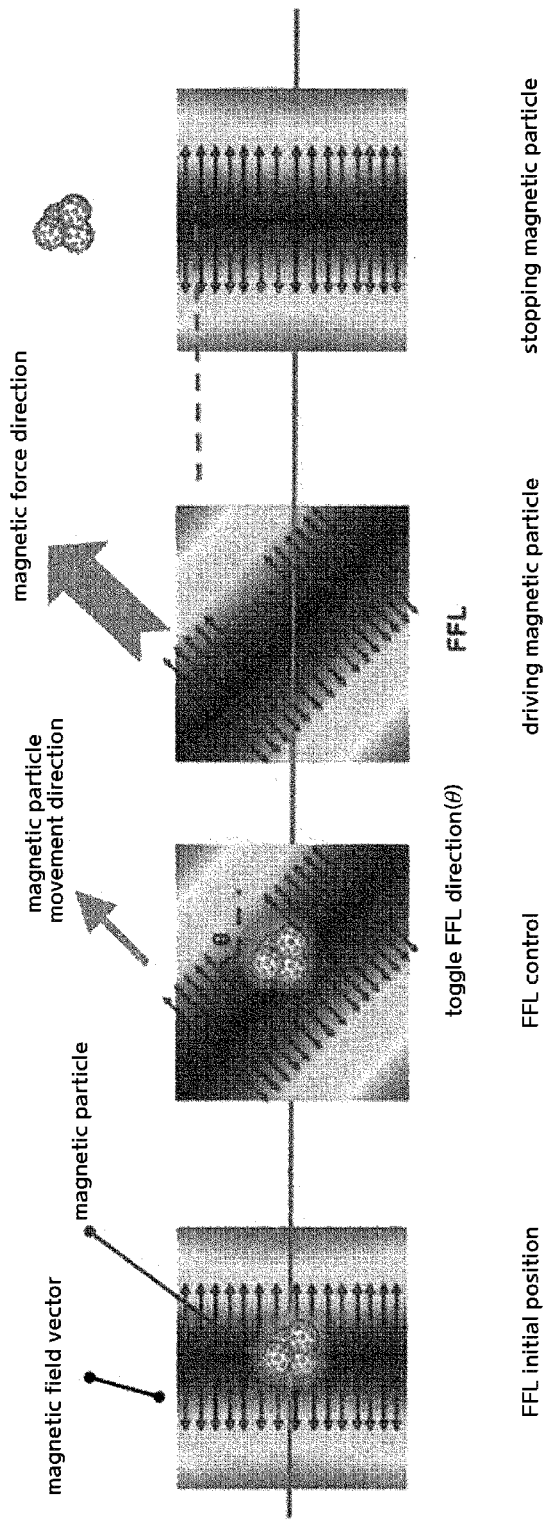

In addition, referring to FIG. 11D, if a field free line is rotated by a certain angle (θ), based on the direction of the magnetic field vector in consideration of the magnetic field vector and the movement direction of the magnetic body after arranging the FFL to overlap with the initial positions of the magnetic body (magnetic particles), the magnetic force acts on the magnetic body such that the magnetic body faces in the movement direction. The magnetic body may be stopped if the field free line is arranged to overlap with the magnetic body again after moving the magnetic body in the movement direction. Using this, the magnetic body may be driven to the target point.

If a series of processes of locating the field free point with respect to the initial position of the magnetic body or arranging the field free lines to overlap the initial position are repeatedly performed after moving the magnetic body, the position of the magnetic body can be recognized while driving the same to a desired point at the same time.

The result obtained by actually experimenting the driving of the magnetic body, described with reference to FIGS. 11C and 11D FIG. is shown in FIG. 11E.

As noted from FIG. 11E, the magnetic particles (ferrofluid) are injected into the Y-tube shaped phantom to be driven left and right, based on the Y-shaped branch point. T1 to T4 indicate the results of driving the magnetic particles to the right of the Y-shaped branch point, and T5 to T8 indicate that the magnetic particles are driven to the left.

INDUSTRIAL APPLICABILITY

The present disclosure relates to an integrated system for driving a magnetic body and recognizing a position thereof, the system including: a magnetic field generating unit including four electromagnetic coils radially spaced apart from each other by the same distance, and a coil frame to which the electromagnetic coils are connected; an RF coil unit disposed in a through-hole included in the center of the coil frame; a driving unit orthogonal to the coil frame and connected to allow the coil frame to slide in one axial direction; and a processing unit configured to generate movement path information of the coil frame and desired current information of the electromagnetic coils.

What is claimed is:

1. An integrated system for driving a magnetic body and recognizing a position thereof, the system comprising:
   a magnetic field generating unit comprising four electromagnetic coils radially spaced apart from each other by an identical distance, and a coil frame to which the electromagnetic coils are connected;
   an RF coil unit disposed in a through-hole included in a central portion of the coil frame;
   a driving unit orthogonal to the coil frame and connected to allow the coil frame to slide in one axial direction; and
   a processing unit configured to generate movement path information of the coil frame and desired current information of each of the four electromagnetic coils;
   wherein a central axis of each of the four electromagnetic coils is directed toward the center of the coil frame,
   wherein the driving unit moves the coil frame according to the movement path information, and
   wherein the processing unit is configured to generate a field free point (FFP) or a field free line (FFL) through the magnetic field generating unit, set a first scan path that is a movement path of the field free point or the field free line, scan the magnetic body along the first scan path, receive a first reflection signal reflected from the magnetic body, and identify a first position of the magnetic body, which is a position on the Z-axis perpendicular to the magnetic field generating unit, by using the first reflection signal.

2. The system of claim 1, wherein each of the four electromagnetic coils comprises at least one selected from the group consisting of a solenoid coil, a circular coil, a square coil, and a saddle coil.

3. The system of claim 1, wherein the RF coil unit comprises an Rx coil and a Tx coil.

4. The system of claim 1, wherein the four electromagnetic coils form an angle of 45 degrees with respect to an axis perpendicular to the longitudinal axis of the driving unit.

5. A method of recognizing a position of a magnetic body, the method comprising:
   a path-setting operation of generating a field free point (FFP) or a field free line (FFL) through a magnetic field generating unit and setting a first scan path that is a movement path of the field free point or the field free line;
   a first scan operation of scanning the magnetic body along the first scan path and receiving a first reflection signal reflected from the magnetic body;
   a first position recognition operation of identifying a first position of the magnetic body, which is a position on the Z-axis perpendicular to the magnetic field generating unit, by using the first reflection signal;
   a second scan operation of scanning the magnetic body along a second scan path on the XY plane perpendicular to the Z-axis, at the first position of the magnetic body and receiving a second reflection signal reflected from the magnetic body; and
   a second position recognition operation of identifying a second position of the magnetic body on the XY plane by using the second reflection signal.

6. The method of claim 5, wherein the first scan path is calculated from movement path information of a coil frame and desired current information of an electromagnetic coil.

7. The method of claim 6, wherein the desired current information of the electromagnetic coil is calculated by Equation 13 below, $$I = Q_0^{-1} M_u^+ D = [i_1 i_2 i_3 i_4]^T \qquad \text{[Equation 13]}$$

wherein I, $M_u$, D, and $Q_0$ satisfy $I \in R_n$, $M_u \in R^{m \times n}$, $D \in R_m$, and $Q_0 \in R^{m \times m}$, respectively, $M_u$ is the square root of Q used for weighted-norm, and $[i_1 \ i_2 \ i_3 \ i_4]^T$ indicates current to be applied to four electromagnetic coils.

8. The method of claim 5, wherein the first scan operation further comprises a first filtering operation of filtering the first reflection signal.

9. The method of claim 5, wherein the magnetic field generating unit comprises four electromagnetic coils radially spaced apart from each other by an identical distance, and a coil frame to which the electromagnetic coils are connected.

10. The method of claim 5, wherein the first position recognition operation further comprises a calculation operation of calculating a second scan path.

11. The method of claim 5, wherein the second scan operation further comprises a second filtering operation of filtering the second reflection signal.

12. The method of claim 5, wherein the second position recognition operation further comprises a current position recognition operation of identifying current position of a magnetic body by using the first position and the second position.

* * * * *